(12) United States Patent
Eddaoudi et al.

(10) Patent No.: US 10,850,268 B2
(45) Date of Patent: *Dec. 1, 2020

(54) HIGHLY STABLE NI—M F6—NH2O/ONPYRAZINE2(SOLVENT)X METAL ORGANIC FRAMEWORKS AND METHODS OF USE

(71) Applicant: King Abdullah University of Science and Technology, Thuwal (SA)

(72) Inventors: Mohamed Eddaoudi, Thuwal (SA); Karim Adil, Thuwal (SA); Youssef Belmabkhout, Thuwal (SA); Amandine Cadiau, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,512

(22) Filed: May 15, 2019

(65) Prior Publication Data

US 2019/0270078 A1    Sep. 5, 2019

Related U.S. Application Data

(63) Continuation of application No. 15/564,920, filed as application No. PCT/IB2016/051991 on Apr. 7, 2016, now Pat. No. 10,335,779.

(Continued)

(51) Int. Cl.
*B01D 53/62* (2006.01)
*B01D 53/02* (2006.01)
(Continued)

(52) U.S. Cl.
CPC .......... *B01J 31/1691* (2013.01); *B01D 53/02* (2013.01); *B01J 20/226* (2013.01); *B01D 2253/116* (2013.01); *B01D 2253/204* (2013.01); *B01D 2256/24* (2013.01); *B01D 2257/304* (2013.01); *B01D 2257/504* (2013.01);
(Continued)

(58) Field of Classification Search
None
See application file for complete search history.

(56) References Cited

U.S. PATENT DOCUMENTS 10,335,779 B2 *   7/2019   Eddaoudi ............. B01J 31/1691

FOREIGN PATENT DOCUMENTS

WO    2014074679 A1    5/2014

OTHER PUBLICATIONS

The Engineering ToolBox, "Air Composition." Viewed on Aug. 18, 2016 at http://www.engineeringtoolbox.com/air-composition-d_212.html.*

(Continued)

*Primary Examiner* — Daniel Berns
(74) *Attorney, Agent, or Firm* — Billion & Armitage; Gregory S. Schwartz

(57) ABSTRACT

Provided herein are metal organic frameworks comprising metal nodes and N-donor organic ligands. Methods for capturing chemical species from fluid compositions comprise contacting a metal organic framework characterized by the formula $[M_aM_bF_{6-n}(O/H_2O)_w(Ligand)_x(solvent)_y]_z$ with a fluid composition and capturing one or more chemical species from the fluid composition.

4 Claims, 13 Drawing Sheets

Related U.S. Application Data

(60) Provisional application No. 62/144,169, filed on Apr. 7, 2015.

(51) Int. Cl.

| | | |
|---|---|---|
| B01D 53/52 | (2006.01) | |
| B01D 53/72 | (2006.01) | |
| B01D 53/80 | (2006.01) | |
| B01D 53/81 | (2006.01) | |
| B01D 53/96 | (2006.01) | |
| B01J 20/22 | (2006.01) | |
| B01J 31/16 | (2006.01) | |

(52) U.S. Cl.
CPC .... B01D 2257/708 (2013.01); B01D 2257/80 (2013.01); B01J 2540/40 (2013.01); Y02C 10/08 (2013.01); Y02E 50/346 (2013.01)

(56) References Cited

OTHER PUBLICATIONS

Bahr, et al., "Mechanical properties of cubic zinc carboxylate IRMOF-1 metal-organic framework crystals", Physical Review B, 2007, 184106/1-184106/7.
Banerjee, et al., "Control of Pore Size and Functionality in Isoreticular Zeolitic Imidazolate Frameworks and their Carbon Dioxide Selective Capture Properties", JACS Communications, 2009, 3875-3877.
Banerjee, et al., "High-Throughput Synthesis of Zeolitic Imidazolate Frameworks and Application to CO2 Capture", Science, Feb. 15, 2008, 939-943.
Bastin, et al., "A Microporous Metal-Organic Framework for Separation of CO2/N2 and CO2/CH4 by Fixed-Bed Adsorption", J. Phys. Chem., 2008, 1575-1581.
Belmabkhout, et al., "Amine-Bearing Mesoporous Silica for CO2 and H2S Removal from Natural Gas and Biogas", Langmuir Letter, 2009, 13275-13278.
Belmabkhout, et al., "Isothermal versus Non-isothermal Adsorption-Desorption Cycling of Triamine-Grafted Pore-Expanded MCM-41 Mesoporous Silica for CO2 Capture from Flue Gas", Energy&Fuels article, American Chemical Society, 2010, 5273-5280.
Belmabkhout, et al., "Simultaneous Adsorption of H2S and CO2 on Triamine-Grafted Pore-Expanded Mesoporous MCM-41 Silica", energy&fuels, ACS Publications, 2011, 1310-1315.
Bishnupada, et al., "Simultaneous Absorption of CO2 and H2S Into Aqueous Blends of N-Methyldiethanolamine and Diethanolamine", Environ. Sci. Technol., 2006, 6076-6084.
Britt, et al., "Highly efficient separation of carbon dioxide by a metal-organic framework replete with open metal sites", Dec. 8, 2009, 20637-20640.
Burd, et al., "Highly Selective Carbon Dioxide Uptake by [Cu(bpy-n)2(SiF6)] (bpy-1=4,4'-Bipyridine; bpy-2 = 1,2-Bis (4-pyridyl)ethene)", Journal of The American Chemical Society, 2012, 3663-3666.
Cadiau, et al., "Hydrothermal synthesis, ab-initio structure determination and NMR study of the first mixed Cu—Al fluorinated MOF", CrystEngComm, The Royal Society of Chemistry, 2013, 3430-3435.
Cadiau, et al., "ZnAlF5'[TAZ]: an Al fluorinated MOF of MIL-53(A1) topology with cationic {Zn(1,2,4 triazole)}2+linkers", Journals of Materials Chemistry, vol. 21, 2011, 3949-3951.
Caskey, et al., "Dramatic Tuning of Carbon Dioxide Uptake via Metal Substitution in a Coordination Polymer with Cylindrical Pores", JACS Communications, 2008, 10870-10871.
Chue, et al., "Comparison of Activated Carbon and Zeolite 13X for COa Recovery from Flue Gas by Pressure Swing Adsorption", Ind. Eng. Chem. Res., 1995, 591-598.
Finsy, et al., "Separation of CO2/CH4 mixtures with the MIL-53(Al) metal-organic", Microporous and Mesoporous Materials, 2009, 221-227.

Furukawa, et al., "Storage of Hydrogen, Methane, and Carbon Dioxide in Highly Porous Covalent Organic Frameworks for Clean Energy Applications", JACS Article, American Chemical Society, 2009, 8875-8883.
Gautier, et al., "Orientational order of [VOF5]2 - and [NbOF5]2 —polar units in chains", Journal of Solid State Chemistry, 2012, 132-139.
Halasyamani, et al., "Syntheses and Structures of Two New Cu/Nb/pyrazine Complexes: Three Dimensional CuNb (pyz)20F5-(pyz)(H2O) and Two Dimensional [Cu(pyz)2.5]+[NbF6-(Pyz)]", Zeitschrift fur anorganische und allgemeine Chemie, 1996, 479-485.
Hamon, et al., "Comparative Study of Hydrogen Sulfide Adsorption in the MIL-53(Al, Cr, Fe), MIL-47(V), MIL-100(Cr), and MIL-101(Cr) Metal-Organic Frameworks at Room Temperature", JACS Communications, Mar. 2, 2009, 8775-8777.
Hao, et al., "Upgrading low-quality natural gas with H2S- and CO2-selective polymer membranes Part I. Process design and economics of membrane stages without recycle streams", Journal of Membrane Science, 2002, 177-206.
Heier, et al., "The Polar [WO2F4]2-Anion in the Solid State", Inorg. Chem., 1999, 762-767.
Hook, et al., "An Investigation of Some Sterically Hindered Amines as Potential Carbon Dioxide Scrubbing Compounds", Ind. Eng. Chem. Res., 1997, 1779-1790.
Li, et al., "Gas Adsorption and Storage in Metal-Organic Framework MOF-177", Langmuir, 2007, 12937-12944.
Lin, et al., "Microporosity, Optical Bandgap Sizes, and Photocatalytic Activity of M(I)-Nb(V) (M = Cu, Ag) Oxyfluoride Hybrids", Crystal Growth & Design Article, 2010, 1323-1331.
Liu, et al., "Comparative Molecular Simulation Study of CO2/N2 and CH4/N2 Separation in Zeolites and Metal-Organic Frameworks", Langmuir Article, American Chemical Society, 2009, 5918-5926.
Llewellyn, et al., "High Uptakes of CO2 and CH4 in Mesoporous Metal-Organic Frameworks MIL-100 and MIL-101", Langmuir, American Chemical Society, 2008, 7245-7250.
Maggard, et al., "Understanding the Role of Helical Chains in the Formation of Noncentrosymmetric Solids", American Chemical Society, 2001, 7742-7743.
Nugent, et al., "Enhancement of CO2 selectivity in a pillared pcu MOM platform through pillar substitution", ChemComm, The Royal Society of Chemistry, 2013, 1606-1608.
Nugent, et al., "Porous materials with optimal adsorption thermodynamics and kinetics for CO2 separation", Nature, Mar. 7, 2013, 80-84.
Park, et al., "Exceptional chemical and thermal stability of zeolitic imidazolate frameworks", PNAS, Jul. 5, 2006, 10186-10191.
Patrick, et al., "Single and Multicomponent Sorption of CO2, CH4 and N2 in a Microporous Metal-Organic Framework", Separation Science and Technology, 2008, 3494-3521.
Phan, et al., "Synthesis, Structure, and Carbon Dioxide Capture Properties of Zeolitic Imidazolate Frameworks", Accounts of chemical research, Jan. 2010, 58-67.
Ravichandar, et al., "Molecular Screening of Metal-Organic Frameworks for CO2 Storage", 2008, 6270-6278.
Shekhah, et al., "Made-to-order metal-organic frameworks for trace carbon dioxide removal and air capture", Nature Communications, 2014, 1-7.
Shin-Ichiro, et al., "Framework Engineering by Anions and Porous Functionalities of Cu(II)/4,4'-bpy Coordination Polymers", JACS Articles, Feb. 20, 2002, 2568-2583.
Siriwardane, et al., "Adsorption of CO2 on Molecular Sieves and Activated Carbon", Energy & Fuels, American Chemical Society, 2001, 279-284.
Skoulidas, et al., "Self-Diffusion and Transport Diffusion of Light Gases in Metal-Organic Framework Materials Assessed Using Molecular Dynamics Simulations", J. Phys. Chem., 2005, 15760-15768.
Subramanian, et al., "Porous Solids by Design: [Zn(4,4'-bpy)2(SiF6)]n-xDMF, a Single Framework Octahedral Coordination Polymer with Large Square Channels", Angew. Chem. Int. Ed. Engl., 1995, 2127-2129.

(56) References Cited

OTHER PUBLICATIONS

Uemura, et al., "Syntheses, Crystal Structures and Adsorption Properties of Ultramicroporous Coordination Polymers Constructed from Hexafluorosilicate Ions and Pyrazine", Eur. J. Inorg. Chem., 2009, 2329-2337.

Veawab, et al., "Corrosion Behavior of Carbon Steel in the CO2 Absorption Process Using Aqueous Amine Solutions", Ind. Eng. Chem. Res., 1999, 3917-3924.

Wang, et al., "Colossal cages in zeolitic imidazolate frameworks as selective carbon dioxide reservoirs", Nature Publishing Group, 2008, 207-212.

Yang, et al., "Computational Study of CO2 Storage in Metal-Organic Frameworks", American Chemical Society, 2008, 1562-1569.

Yang, et al., "Molecular Simulation of Separation of CO2 from Flue Gases in Cu-BTC Metal-Organic Framework", AlChE Journal, Nov. 2007, 2832-2840.

Yazaydin, et al., "Screening of Metal-Organic Frameworks for Carbon Dioxide Capture from Flue Gas Using a Combined Experimental and Modeling Approach", JACS Communications, American Chemical Society, 2009, 18198-18199.

Youn-Sang, et al., "Carborane-based metal—organic frameworks as highly selective sorbents for CO2 over methane", The Royal Society of Chemistry, 2008, 4135-4137.

Notification of Transmittal of the International Search Report and the Written Opinion of the International Searching Authority, or the Declaration for PCT/IB2016/051991, dated Sep. 7, 2016.

\* cited by examiner

HIGHLY STABLE NI—M F6—NH2O/ONPYRAZINE2(SOLVENT)X METAL ORGANIC FRAMEWORKS AND METHODS OF USE

CROSS-REFERENCE TO RELATED APPLICATIONS

This application is a continuation of U.S. application Ser. No. 15/564,920, filed Oct. 6, 2017, which is a U.S. National Stage Application of Application No. PCT/IB2016/05199, filed Apr. 7, 2016, which claims priority to U.S. Provisional Application No. 62/144,169, filed Apr. 7, 2015, which application is incorporated herein by reference.

BACKGROUND

Within many industries today, removal of volatile organic compounds (VOCs) from gases is a worldwide priority due to their health risks and harmful effects on the environment. In particular, organizations such as the Environmental Protection Agency have placed strict limits on the emission of certain classes of VOCs, including BTX (benzene, toluene, xylene), BTEX (benzene, toluene, ethylbenzene, and xylene), BTEXN (benzene, toluene, ethylbenzene, xylene, and naphthalene), and TEXS (benzene, toluene, ethylbenzene, xylene, and styrene). However, separation and capture of such VOCs remain some of the most intensive and challenging industrial separations. Further, the presence of VOCs in gasses frustrates many industrial processes. For example, amine scrubbing is a common process used to remove acid gases such as $CO_2$ and $H_2S$ from raw gas, but the amine process solution is easily contaminated by VOCs such as BTX and BTEX present within the gas.

Solid, porous material systems are a developing class of materials that have potential to solve or alleviate many technical problems generally germane to gas capture. Zeolite materials have long been used in many gas capture applications, but suffer from limited gas selectivity and cyclic adsorption performance in the presence of moisture. Metal organic frameworks (MOFs) are a new class of material which generally include porous crystals assembled from modular molecular building blocks, and provide a wide array of advantageous material properties including high surface area, porosity, and sorption potential. While the available building block options, and combinations thereof, are virtually limitless, such potential highlights the statistical difficulty in identifying and assembling MOFs with desired and particularized material properties and multi-faceted functionality. For example, many MOFs exhibit high selectivity towards a particular molecular species, but are highly intolerant to water.

SUMMARY

In general, this disclosure describes porous metal organic frameworks (MOFs). In particular, this disclosure describes MOFs suitable for the capture and removal of gases and/or vapors from fluids. It should be noted that although the embodiments of this disclosure are described with respect to examples for gas capture, the embodiments described herein are generally applicable to many fields including gas molecule separation, gas storage, catalysis, sensors, drug delivery, rare gas separation, and proton conductivity.

As provided herein, a method of capturing chemical species from a fluid composition can comprise contacting a metal organic framework characterized by the formula $[M_aM_bF_{6-n}(O/H_2O)_w(\text{Ligand})_x(\text{solvent})_y]_z$ with a fluid composition comprising two or more chemical species and capturing one or more captured chemical species from the fluid composition.

The details of one or more examples are set forth in the accompanying drawings and the description below. Other features, objects, and advantages will be apparent from the description and drawings, and from the claims.

BRIEF DESCRIPTION OF THE DRAWINGS

The accompanying drawings illustrate non-limiting example embodiments of the invention.

DETAILED DESCRIPTION

Figure 1B:
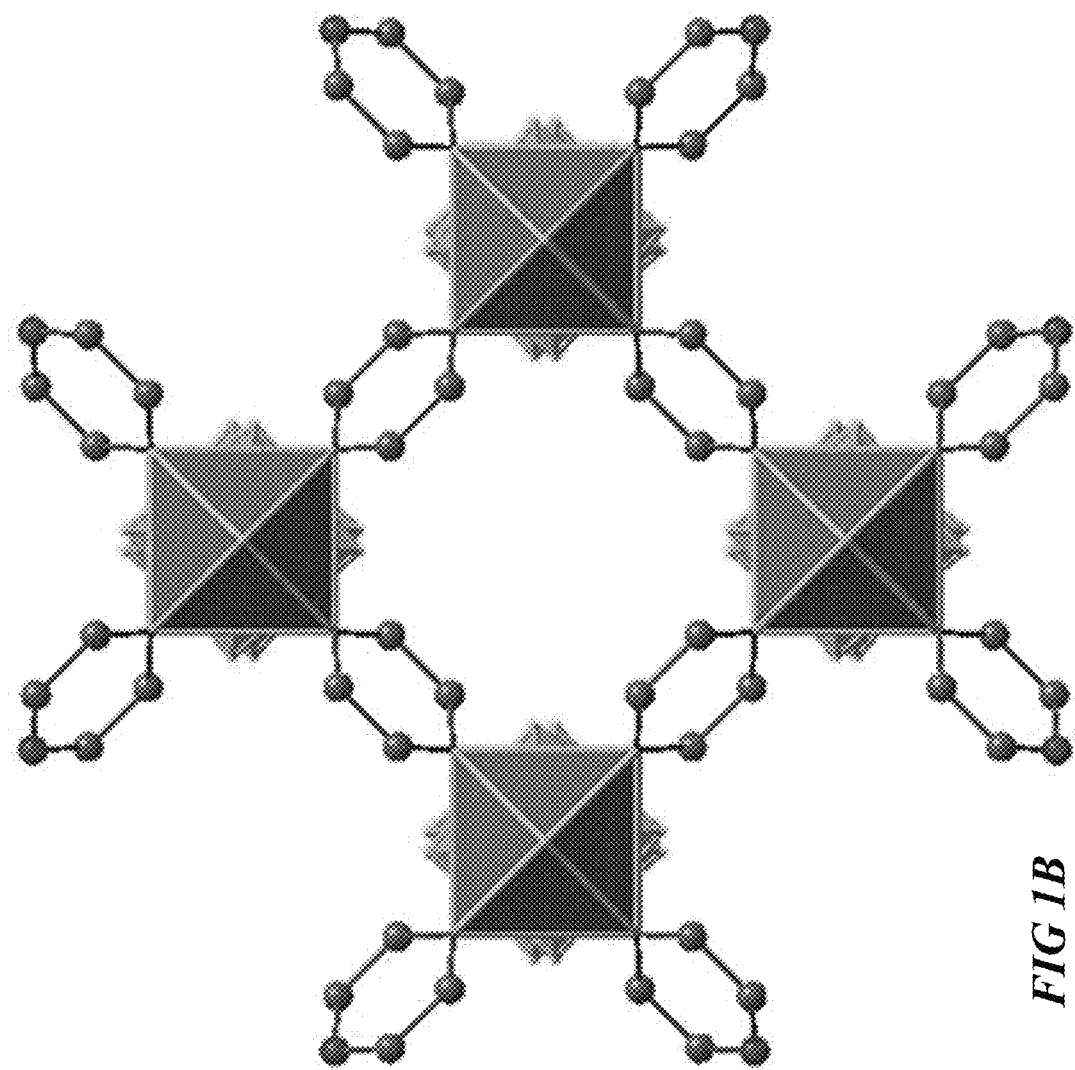
FIGS. 1A-B illustrate schematic views of a metal organic framework, according to one or more embodiments of this disclosure.

Provided herein are a series of highly stable and highly tunable MOFs with high affinity and stability to water and $H_2S$. Such qualities allow for efficient and cost effective methods for dehydrating gases, vapors, and solvents capable of replacing many cumbersome and expensive industrial processes. Further, this novel series of MOFs can be designed with a variety of pore sizes and assembled with and without open-metal sites, affording tunable properties for a variety of separation applications. For example, the MOFs provided herein can refine hydrocarbon fluids under conditions and in the presence of chemical species which render known technologies inefficient, impracticable, or inoperable. In particular, MOFs provided herein can perform molecular sieving of fluid mixtures such as olefin/paraffin mixtures. In another example, the MOFs described herein are suitable for applications involving BTX removal from fluid compositions comprising $H_2S$, which offers enormous cost savings by protecting and maintaining the operation efficiency of Claus catalysts.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As used herein, "fluids" can refer to a gas, liquid, or combination thereof. A gas or liquid can include one or more components. For example, a fluid can include a gas stream comprising $CO_2$, $H_2S$ and water vapor.

As used herein, "refining" refers to removing one or more unwanted components or separating one or more components from remaining components of a composition. For example, refining can include removing olefin chemical species from a fluid composition, such as a mixture of olefin and paraffin chemical species.

As used herein, "poly-functional" refers to the characteristic of having more than one reactive or binding sites. For example, a poly-functional ligand can attach to a metal ion in multiple ways, bridge multiple metal ions, or combinations thereof. Specifically, pyrazine is a poly-functional ligand.

As used herein, "olefin" refers to an unsaturated hydrocarbon molecule including a carbon-carbon double bond. Olefins are also referred to as alkenes. An example of an olefin is propene.

As used herein, "paraffin" refers to a saturated hydrocarbon molecule consisting of carbon and hydrogen atoms connected only by single bonds. Paraffins are also referred to as alkanes. An example of a paraffin is propane.

Gas storage and separation using porous materials has experienced significant development in recent years in various industrial applications related to energy, environment, and medicine. Among porous materials, metal organic frameworks (MOFs) are a versatile and promising class of crystalline solid state materials which allow porosity and functionality to be tailored towards various applications. MOF crystal chemistry uses a molecular building block (MBB) approach that offers potential to construct MOFs where desired structural and geometrical information are incorporated into the building blocks prior to the assembly process.

Generally, MOFs comprise a network of nodes and ligands, wherein a node has a connectivity capability at three or more functional sites, and a ligand has a connectivity capability at two functional sites each of which connect to a node. Nodes are typically metal ions or metal containing clusters, and, in some instances, ligands with node connectivity capability at three or more functional sites can also be characterized as nodes. In some instances, ligands can include two functional sites capable of each connecting to a node, and one or more additional functional sites which do not connect to nodes within a particular framework. A MBB can comprise a metal-based node and an organic ligand which extrapolate to form a coordination network. Such coordination networks have advantageous crystalline and porous characteristics affecting structural integrity and interaction with foreign species (e.g., gases). The particular combination of nodes and ligands within a framework will dictate the framework topology and functionality. While essentially limitless combinations of nodes and ligands exist, to date, very few MOF materials are $H_2S$ stable which consequently preclude their use in gas separation.

As disclosed in co-owned U.S. Application No. 62/044,928, a series of isoreticular MOFs with periodically arrayed hexafluorosilicate ($SiF_6$) pillars, called SIFSIX-2-Cu-i and SIFSIX-3-Zn, SIFSIX-3-Cu and SIFSIX-3-Ni showed particularly high $CO_2$ selectivity and capture. These properties in SIFSIX-3-M materials suggest broad applications from ppm level $CO_2$ removal to bulk $CO_2$ separation. However, with the exception of SIFSIX-3-Ni, the SIFSIX-3-M materials were not tolerant to $H_2S$. And although these materials exhibit high structural structurally in the presence of $CO_2$, extensive exposure of all SIFSIX-3-M materials to moisture detrimentally induces a phase change and the formation of new 2D stable materials. These 2D materials exhibit relatively unaltered selectivity but diminished $CO_2$ uptake. This indicates that the SIFSIX-3-M materials series is not sufficiently robust to handle $CO_2$ and $H_2S$ capture in most critical applications throughout the oil and gas and renewable fuels industries, especially in applications which bring the materials into contact with moisture.

MOFs, as provided herein, comprise one or more MBBs. Generally, a MBB, or a network of MBBs, can be represented by the formula $[(node)_a(ligand)_b(solvent)_c]_n$, n represents the number of molecular building blocks. Solvent represents a guest molecule occupying pores within the MOF, for example as a result of MOF synthesis, and can be evacuated after synthesis to provide a MOF with unoccupied pores. In one example, an evacuated MOF can be subsequently enriched with a guest molecule compatible with the MOF framework and/or pores for a particular purpose (e.g., to outfit the MOF for use as a sensor). In other embodiments, guest molecules can include adsorbed gases, such as $H_2S$. While guest molecules can impart functionality onto a MOF, such are not a permanent fixture of the MOF. Accordingly, the value of c can vary down to zero, without changing the definitional framework of the MOF. Therefore in many instances, MOFs as provided herein will be defined as $[(node)_a(ligand)_b]_n$, without reference to a solvent or guest molecule component.

In some embodiments herein, MOFs can be characterized by the formula $[(node)_a(ligand)_b(solvent)_c]_n$. A non-limiting list of solvents can include one or more of $H_2O$, DMF, and DEF. In some embodiments, solvent can include a chemical species present after fabrication of the MOF. Some embodiments herein comprise a porous, uninhabited MOF characterized by the formula $[(node)_a(ligand)_b]_n$, wherein node comprises, generally, $M_aM_bF_xO_y(H_2O)_z$. In some embodiments, $M_a$ comprises elements selected from periodic groups IB, IIA, IIB, IIIA, IVA, IVB, VIB, VIIB, or VIII. In some embodiments, $M_b$ comprises elements selected from periodic groups IIIA, IIIB, IVB, VB, VIB, or VIII. In some embodiments, $M_a$ comprises elements selected from periodic groups IB, IIA, IIB, IIIA, IVA, IVB, VIB, VIIB, or VIII and $M_b$ comprises elements selected from periodic groups IIIA, IIIB, IVB, VB, VIB, or VIII. In some embodiments, $M_a$ can comprise one of the following cations: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$ and $Co^3$. In some embodiments, $M_b$ can be one of the following $Al^{+3}$, $Fe^{+2}$, $Fe^{+3}$, $Cr^{2+}$, $Cr^{3+}$, $Ti^{3+}$, $V^{3+}$, $V^{5+}$, $Sc^{3+}$, $In^{3+}$, $Nb^{5+}$, $Y^{3+}$. In some embodiments, $M_a$ can comprise one of the following cations: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$ and $Co^3$; $M_b$ can be one of the following $Al^{+3}$, $Fe^{+2}$, $Fe^{+3}$, $Cr^{2+}$, $Cr^{3+}$, $Ti^{3+}$, $V^{3+}$, $V^{5+}$, $Sc^{3+}$, $In^{3+}$, $Nb^{5+}$, $Y^{3+}$. In such embodiments, the ligand can be any bi-functional N-donor linkers based on monocyclic or polycyclic group (aromatic or not).

In some embodiments, a ligand can comprise a polydentate, or poly-functional ligand, such as a bi-functional ligand, a tri-functional ligand, or ligands with four or more functional sites. In some embodiments, a ligand can comprise an N-donor linker. In some embodiments a ligand can comprise a poly-functional ligand. In some embodiments, a ligand can comprise a plurality of N-donor functional groups. In some embodiments, a ligand can comprise a monocyclic or polycyclic group structure, wherein the cyclic groups can be aromatic or non-aromatic. In some embodiments, a ligand can comprise a nitrogen-containing monocyclic or polycyclic group structure. In some embodiments, a ligand can comprise a nitrogen-containing heterocyclic ligand, including pyridine, pyrazine, pyrimidine, pyridazine, triazine, thiazole, oxazole, pyrrole, imidazole, pyrazole, triazole, oxadiazole, thiadiazole, quinoline, benzoxazole, benzimidazole, and tautomers thereof.

Some embodiments of suitable MOFs can be represented by the following general formula: $[M_aM_bF_x(O/H_2O)_z(Ligand)_2]_n$ wherein $M_a$ can be one of the following cations: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$ and $Co^3$; $M_b$ can be one of the following $Al^{+3}$, $Fe^{+2}$, $Fe^{+3}$, $Cr^{2+}$, $Cr^{3+}$, $Ti^{3+}$, $V^{3+}$, $V^{5+}$, $Sc^{3+}$, $In^{3+}$, $Nb^{5+}$, $Y^{3+}$; and the ligand can be any bi-functional N-donor linkers based on monocyclic or polycyclic group (aromatic or not).

Figure 1A:
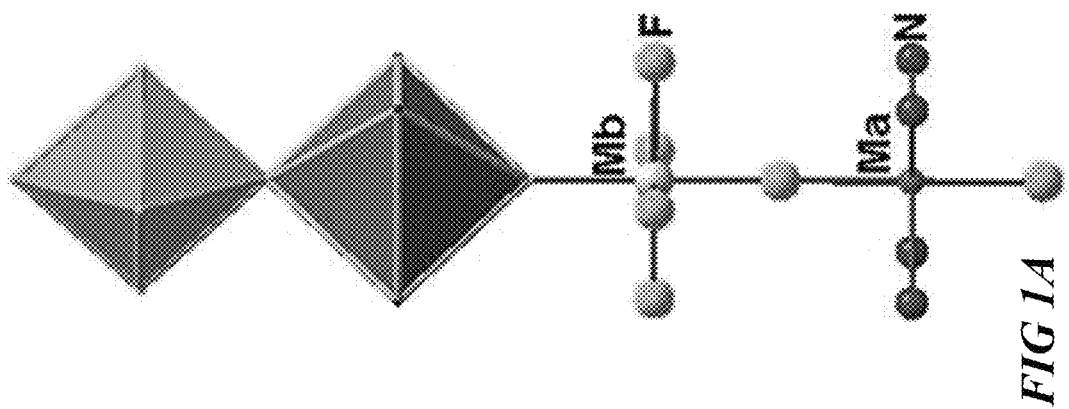

One MOF synthesis strategy provided herein comprises linking inorganic chains using appropriate N-donor based linkers to deliberately generate channels along one crystallographic direction. The inorganic chains are built up from the trans-connection between $M_aN_4F_2$ and $M_bF_4(H_2O)_2$ octahedra or between $M_aN_4F_2$ and $M_bF_5(H_2O)$ octahedra or between $M_aN_4F_2$ octahedra and $M_bF_5(O)$ octahedra. FIG. 1A illustrates an example of an inorganic chain, built up from $M_aN_4F_2$ and $M_bF_5(H_2O)$ octahedra. The resulted inorganic chains are linked to each other using bi-functional N-donor organic ligands, thereby generating channels with different sizes and shapes depending on the nature of the organic linker. FIG. 1B illustrates a schematic view of one embodiment of a MOF comprising a $NiNbF_5O(pyrazine)_2$ structure, viewed along the c-axis.

The utility of MOFs such as those provided herein are highly dependent upon the framework's structural features such as structural strength, density, functionality, pore aperture dimensions, pore dimensions, the ratio of pore aperture dimensions to pore dimensions, pore accessibility, and the presence of a plurality of pore dimensions and/or pore aperture dimensions (e.g., a poly-porous MOF). The originality of this new class of crystalline porous materials is based, in part, on the fact that the shape of cavities, (i.e. square or rectangle based channels), is controlled from a structural point of view using appropriate cations and organic linkers. The novel MOF architectures disclosed herein offer a novel improvement on some MOF architectures by replacing silicon components with other metals, such as $Al^{3+}$, $Fe^{2+}$, $Fe^{3+}$, $V^{3+}$, $V^{4+}$, $V^{5+}$, $Nb^{5+}$, to afford highly stable materials with or without open metals sites. In some embodiments, the use of specific cations, such as $Al^{+3}$, $Fe^{+2}$, $Fe^{+3}$, $Cr^{2+}$, $Cr^{3+}$, $Ti^{3+}$, $V^{3+}$, $V^{5+}$, $Sc^{3+}$, $In^{3+}$, $Y^{3+}$, in $M_b$ site positions can introduce open-metal sites within the channels that enhance properties of gas capture.

These, and other features, collaborate to achieve MOFs with high affinity and stability to water and $H_2S$. Additionally, the novel series of MOFs structures disclosed herein can be designed with a variety of pore sizes and/or open-metal sites which afford tunable properties for a variety of gas/vapor/solvent separation applications. Tuning, in some embodiments, can include modification of the organic and/or inorganic components of the MOF. For example, lighter metal-based clusters can be used to lower the framework density and increase the relative wt. % of captured $CO_2$ and/or $H_2S$. Further, the MOF platforms as provided herein allow for an unprecedented high degree of tuning control at the molecular level, allowing the size and shape of channels within a MOF architecture to be rigorously controlled and adapted to specific separation of numerous gases, beyond $CO_2$ and $H_2S$.

In some embodiments, a representative $[M_aM_bF_{6-n}(O/H_2O)_w(Ligand)_x(solvent)_y]_z$ MOF structure can include a Ni $M_a$ constituent, an $M_b$ constituent group selected from one of Al, Fe, V, or Nb, and a Ligand comprising a pyrazine constituent group. All such embodiments offer high affinity and stability to water vapor and $H_2S$, unlike the Cu and Zn-based analogues of SIFSIX-3-M materials made with Si. In in some embodiments a MOF characterized by the formula $[M_aM_bF_{6-n}(O/H_2O)_w(Ligand)_x(solvent)_y]_z$ wherein $M_a$ equals Ni, $M_b$ equals Al, Fe, V or Nb, and ligand equals pyrazine, the pore size (channel size) of the resulting MOF can be about 3.3 Å to about 3.8 Å, or about 2.8 Å to about 4.8 Å. In some embodiments, the channels are square/rectangular. In the same or in an alternative embodiment, a MOF can have a specific surface area of about 250 m2/g to about 500 m2/g. In either of the same MOFs or in an alternative embodiment, a MOF can have a pore volume of about 0.1 cm3/g to about 0.25 cm3/g. In a different embodiment, a more elongated ligand can provide an analogous MOF with much higher porosity.

In some embodiments, $M_b$ and/or a ligand can be selected to hinder or allow rotation of a ligand. Altering the nature, shape, and dimensions of the $(M_bOF_5)^{x-}$ pillars employed in $[M_aM_bF_{6-n}(O/H_2O)_w(Ligand)_x(solvent)_y]_z$ MOFs can selectively hinder the free rotation of ligands and thus dictate the maximum and/or minimum opening of the pore aperture size. This approach offers potential to dial-in/command the passing-blocking of specific probe molecules. In some embodiments $M_b$ and/or a ligand are selected to allow no rotation of a ligand. In some embodiments $M_b$ and/or a ligand are selected to allow full rotation of a ligand. In some embodiments $M_b$ and/or a ligand are selected to allow partial rotation of a ligand.

In some embodiments, $M_b$ and/or a ligand can be selected to hinder or allow rotation of a pillar. Altering the nature, shape, and dimensions of the $(M_bOF_5)^{x-}$ pillars employed in $[M_aM_bF_{6-n}(O/H_2O)_w(Ligand)_x(solvent)_y]_z$ MOFs can selectively hinder the free rotation of pillars and thus dictate the maximum and/or minimum opening of the pore aperture size. This approach offers potential to dial-in/command the passing-blocking of specific probe molecules. In some embodiments $M_b$ and/or a ligand are selected to allow no rotation of a pillar. In some embodiments $M_b$ and/or a ligand are selected to allow full rotation of a pillar. In some embodiments $M_b$ and/or a ligand are selected to allow partial rotation of a pillar.

In some embodiments, $M_b$ and/or a ligand can be selected to hinder or allow rotation of a ligand and a pillar. Altering the nature, shape, and dimensions of the $(M_bOF_5)^{x-}$ pillars employed in $[M_aM_bF_{6-n}(O/H_2O)_w(Ligand)_x(solvent)_y]_z$ MOFs can selectively hinder the free rotation of a ligand and a pillar and thus dictate the maximum and/or minimum opening of the pore aperture size. This approach offers potential to dial-in/command the passing-blocking of specific probe molecules. In some embodiments $M_b$ and/or a ligand are selected to allow no rotation of a ligand and a pillar. In some embodiments $M_b$ and/or a ligand are selected to allow full rotation of a ligand and a pillar. In some embodiments $M_b$ and/or a ligand are selected to allow partial rotation of a ligand and a pillar.

A specific MOF characterized by the formula $[M_aM_bF_{6-n}(O/H_2O)_w(Ligand)_x(solvent)_y]_z$ is NbOFFIVE-1-Ni, wherein $M_a$ comprises Ni and $M_b$ comprises Nb. This MOF includes a $(NbOF_5)^{2-}$ inorganic pillar which, due to the larger $Nb^{+5}$, has a longer Nb—F bond length (1.905(1) Å) as compared to the Si—F bond length (1.681(1) Å) of the SIFSIX MOFs described above. The increased Nb—F bond length reduces the distance between the pendant fluorine in the channel, and the relatively increased nucleophile behavior of $(NbOF_5)^{2-}$ provides increased stability in the presence of water. Pyrazine is a suitable ligand for the NbOFFIVE-1-Ni MOF, among others as described herein. NbOFFIVE-1-Ni is a pillared sql-MOF based on $(NbOF_5)^{2-}$ pillars that connect a 2D square grid of Ni-(pyrazine)$_2$. The quadrangular-pillared sql-MOF can be viewed as a 3D MOF wherein each NiOF (pyrazine)$_4$ node serves as 6-connected node connected by $(NbOF_5)^{2-}$ pillars through fluorine/oxygen atoms giving rise to a pcu topology. It must be noted that the assignment of one oxygen and one fluorine atom in apical position within the pillar has been previously demonstrated in similar materials and confirmed with supporting techniques.[12] The overall framework consists of square shaped open channels having slightly smaller diameters of about 3.175(1) Å (taking account of van der Walls radii) comparatively to the analogue material SIFSIX-3-Cu (3.980(1) Å).

A specific MOF characterized by the formula $[M_aM_bF_{6-n}(O/H_2O)_w(Ligand)_x(solvent)_y]_z$ is AlFFIVEH$_2$O-1-Ni, wherein $M_a$ comprises Ni and $M_b$ comprises Al. When utilizing a pyrazine ligand, this MOF can be characterized by the specific formula NiAlF$_5$(H$_2$O)(pyr)$_2$.2H$_2$O, although other ligands described herein can be suitable. Another specific MOF characterized by the formula $[M_aM_bF_{6-n}(O/H_2O)_w(Ligand)_x(solvent)_y]_z$ is FeFFIVEH$_2$O-1-Ni, wherein $M_a$ comprises Ni and $M_b$ comprises Fe. When utilizing a pyrazine ligand, this MOF can be characterized by the specific formula NiFeF$_5$(H$_2$O)(pyr)$_2$.4H$_2$O, although other ligands described herein can be suitable. AlFFIVEH$_2$O-1-Ni and FeFFIVEH$_2$O-1-Ni are isomorphs, and take advantage of the periodically arrayed fluorine combined with the adequate one dimensional channel size. In contrast to the Si of SIFSIX MOFs described above, the introduction of open metal sites within the framework is concomitant with the utilization of an appropriate metal with the required oxidation state that allows the presence of a water molecule within the metal coordination sphere. Aluminum and Iron cations were used such that the MOF would adopt an octahedral fluorinated environment and lead to open metal sites after coordinated water removal via proper activation. Each isomorph utilizing pyrazine as a ligand exhibits a primitive cubic (pcu) topology resulting from the pillaring of metal-pyrazine 2D square-grid moieties with $(MF_5H_2O)^{2-}$ ($M=Al^{3+}$ or $Fe^{3+}$) inorganic pillars.

Figure 2:
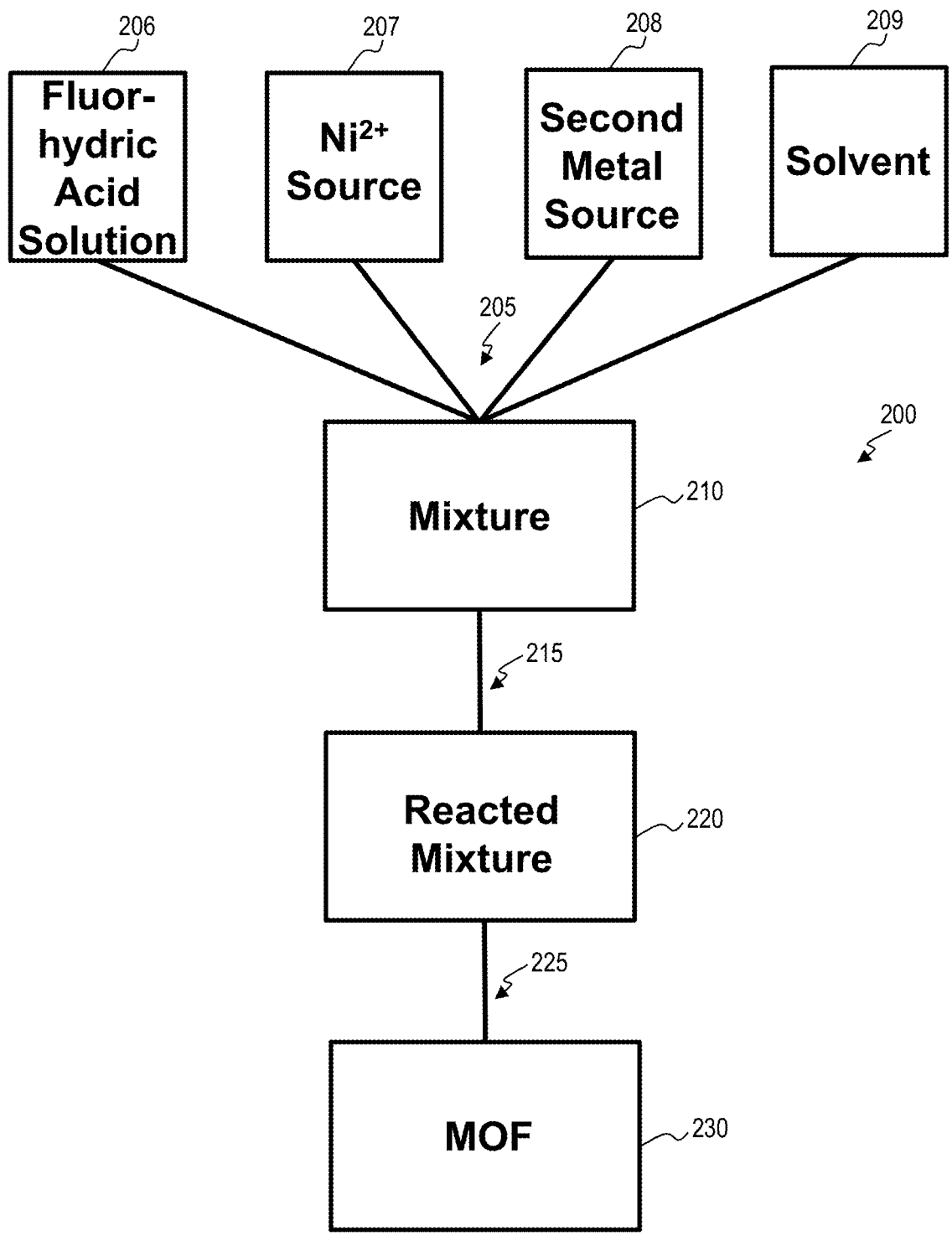
FIG. 2 illustrates a method for fabricating a metal organic framework, according to one or more embodiments of the disclosure.

Some such MOFs can be fabricated using a solvo(hydro)thermal synthetic procedure. As shown in FIG. 2, a method for fabricating 200 a MOF 230 can include combining 205 reactants. Reactants can include one or more of a fluorhydric acid solution 206 with a $Ni^{2+}$ source 207, a second metal source 208, and a solvent 209 to form a mixture 210. A $Ni^{2+}$ source 207 can include one or more of nickel nitrate, hydrated nickel nitrate, nickel chloride, hydrated nickel chloride, nickel fluoride, hydrated nickel fluoride, nickel oxide, or hydrated nickel oxide. The second metal source 208 can include an $Al^{+3}$ source, an $Fe^{+2}$ source, an $Fe^{+3}$ source, a $Cr^{2+}$ source, a $Cr^{3+}$ source, a $Ti^{3+}$ source, a $V^{3+}$ source, a $V^{5+}$ source, a $Sc^{3+}$ source, an $In^{3+}$ source, a $Nb^{5+}$ source, or a $Y^{3+}$ source, for example. These, metals can be in the form of nitrates, hydrated nitrates, chlorides, hydrated chlorides, fluorides, hydrated fluorides, oxides, hydrated oxides, and combinations thereof. The solvent 209 can include one or more of H$_2$O, dimethylformamide (DMF), and diethylformamide (DEF).

The method for fabricating 200 can further comprise to reacting 215 the mixture 210, sufficient to form a reacted mixture 220. Reacting 215 can include contacting the fluorhydric acid solution 206, the $Ni^{2+}$ source 207, the second metal source 208, and the solvent 209. Reacting 215 can further comprise stirring or agitating the mixture 210, or heating the mixture 210. Heating the mixture 210 can comprise heating to a temperature between about 80° C. to about 200° C. The reacted mixture 220 can be further processed 225 to provide a fabricated MOF 230. Processing 220 can include one or more of filtering the reacted mixture 220, rinsing the reacted mixture 220 with water, removing excess reactants from the reacted mixture 220. In some embodiments, guest molecules are optionally evacuated from a fabricated MOF 230. Guest molecules can include solvent guest molecules, or derivatives thereof.

Figure 3:
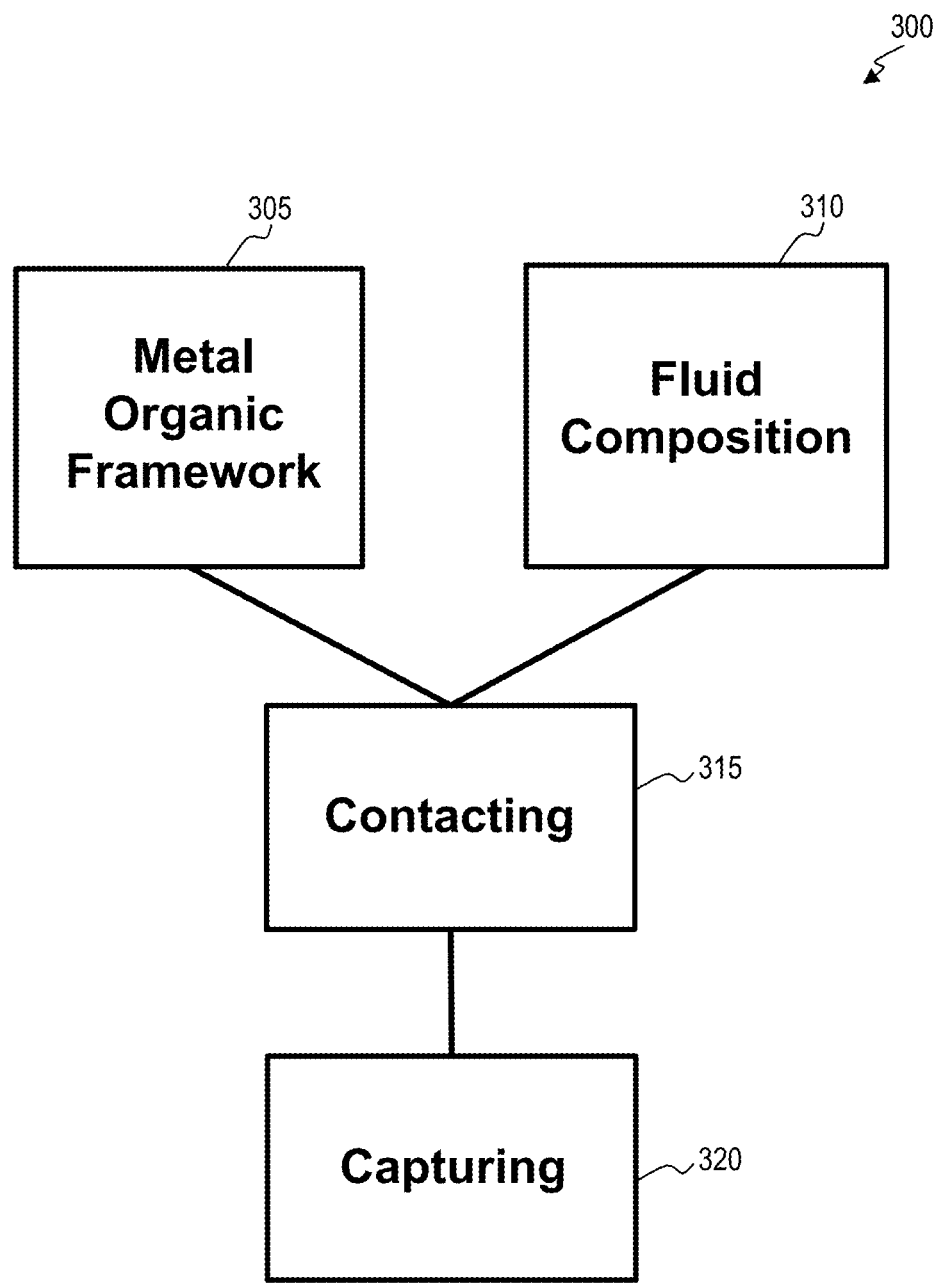
FIG. 3 illustrates a method for capturing chemical species from fluid compositions, according to one or more embodiments of the disclosure.

FIG. 3 illustrates a method 300 for capturing 320 one or more chemical species from a fluid composition 310 via a MOF 305. A method 300 for capturing 320 one or more chemical species from a fluid composition 310 can comprise contacting 315 a metal organic framework 305 characterized by the formula $[M_aM_bF_{6-n}(O/H_2O)_w(Ligand)_x(solvent)_y]_z$ with a fluid composition 310. Fluid composition 310 can comprise two or more chemical species. Method 300 can further comprise capturing 320 one or more captured chemical species from the fluid composition 310. In some embodiments, capturing 320 comprises physical adsorption of the one or more captured chemical species by the metal organic framework 305. In some embodiments, capturing 320 comprises chemisorption of the one or more captured chemical species by the metal organic framework. Chemisorption can occur by one or more captured chemical species chemically interacting with one or more open metal sites of the metal organic framework 305. In other embodiments, capturing 320 comprises physical adsorption and chemisorption of the one or more captured chemical species by the metal organic framework. Capturing can comprise wholly or partially containing a chemical species within a pore of a MOF. In some embodiments, capturing 320 consists of chemisorption. In some embodiments, capturing 320 consists of physical adsorption.

In some embodiments, the fluid composition 310 can comprise $H_2S$ and one or more of benzene, toluene, xylene, ethylbenzene, naphthalene and styrene. In such embodiments, capturing 320 can comprise capturing one or more of benzene, toluene, xylene, ethylbenzene, naphthalene, and styrene. In a specific embodiment, $M_a$ can comprise Ni2+ and $M_b$ can comprise Nb5+.

In some embodiments, the fluid composition 310 can comprise breathable air. Breathable air can include atmospheric air, or life-supporting air in a confined space. In a non-limiting example, breathable air can include one or more of oxygen, nitrogen, carbon dioxide, and argon. In such embodiments, capturing 320 can comprise capturing carbon dioxide. In such embodiments, capturing 320 can consist of capturing carbon dioxide. In such embodiments, capturing 320 occurs in a confined space. Capturing 320 can comprise capturing trace amounts of carbon dioxide.

In some embodiments, the fluid composition 310 can comprise one or more of flue gas, syngas, biogas and landfill gas. In such embodiments, capturing 320 can comprise capturing carbon dioxide. In such embodiments, capturing 320 can consist of capturing carbon dioxide.

In some embodiments, the fluid composition 310 can comprise one or more gases, one or more vapors, one or more solvents, or combinations thereof. In such embodiments, capturing 320 can comprise capturing water. In such embodiments, capturing 320 can consist of capturing water. In one embodiment, $M_a$ can comprise Ni2+ and $M_b$ can comprise Fe+2 or Fe+3.

In some embodiments, the fluid composition 310 can comprise one or more olefin species and one or more paraffin species. In such embodiments, capturing 320 can comprise capturing one or more olefins. In a particular embodiment, the one or more olefin species can comprise ethylene and the one or more paraffin species can comprise ethane. In another particular embodiment, the one or more olefin species can comprise propylene and the one or more paraffin species can comprise propane.

In some embodiments, the fluid composition 310 can comprise $H_2S$ and one or more hydrocarbon species. In such embodiments, capturing 320 can comprise capturing $H_2S$. In such embodiments, capturing 320 can consist of capturing $H_2S$. In such embodiments, the one or more hydrocarbon species can comprise one or more open-chain hydrocarbons. In a particular embodiment, the one or more open-chain hydrocarbons can comprise propane, propene, ethane, ethene, and combinations thereof.

In some embodiments, one or more MOFs described herein are suitable for applications involving gas, vapor, and/or solvent dehydration. The particular outstanding properties of $NiM_bF_{6-2}O_w(H_2O)_x(Ligand)_y(solvent)_z$, wherein $M_b$ can comprise Al, Fe, V, or Nb, for example, as compared to SIFSIX-3-M (Cu, Zn, Ni) materials, and others known in the art, in terms of stability to moisture, and $H_2O$ uptake and affinity make these series of novel MOFs suitable for many industrial application where various degree of humidity need to be removed. Furthermore, these materials are advantageous in that exposure to moisture in non-process settings (e.g., transport, installation, maintenance, etc.) will not affect performance.

In some embodiments, one or more MOFs described herein are suitable for applications involving CO2 capture from flue gas, syngas, biogas and landfill gas. In particular, MOFs, with and without open metal sites, characterized by the formula $NiM_bF_6O_x(H_2O)_y(Ligand)_z$ exhibit a number advantageous of $CO_2$ properties (e.g., uptake, selectivity, and kinetics) at various concentrations (e.g., from 1% to 50%) and humidity values (e.g., up to ca. 100% relative humidity) for a wide variety of relevant industrial gases.

In some embodiments, one or more MOFs described herein are suitable for applications involving $CO_2$ removal in confined spaces. Efficient removal of $CO_2$ at low concentrations is vital for the proper operation of many confined-space systems, such as breathing systems. Confined spaces can include those found in submarines and aerospace craft. For example, in long-term space flight and submarine missions where air resupply opportunities are scarce, $CO_2$ must be removed from the air and recycled. An average crew member requires approximately 0.84 kg of oxygen and emits approximately 1 kg of carbon dioxide per day. Thus the ability to continuously purify exhaled air to a maximum $CO_2$ concentration of 2-5% will lead to an optimal recycling and considerable reduction in fresh air supply in remote confined spaces. The shortcomings of existing technologies include a low daily capture capacity, due in part to the long temperature swing adsorption cycling (TSA) mode, which is determined mainly by absorbent reactivation. In case of low $CO_2$ concentration removal, chemical adsorbents (e.g., amine supported absorbents) are preferred with a heat of adsorption of 70-100 kJ/mol. The heat of adsorption indicates the energy required to clean the material after each adsorption cycle. The MOFs disclosed herein, such as NbOFFIVE-1-Ni, among others, operate purely on physical adsorption in processes such as VTSA or VSA (under mild vacuum), and therefore can both increase the daily $CO_2$ removal capacity and significantly decrease the energy needed for regeneration to lower than 2500 kJ/Kg $CO_2$. This is significantly lower than the 4,000-5,000 kJ/Kg $CO_2$ required by liquid amine scrubbing.

Figure 4A:
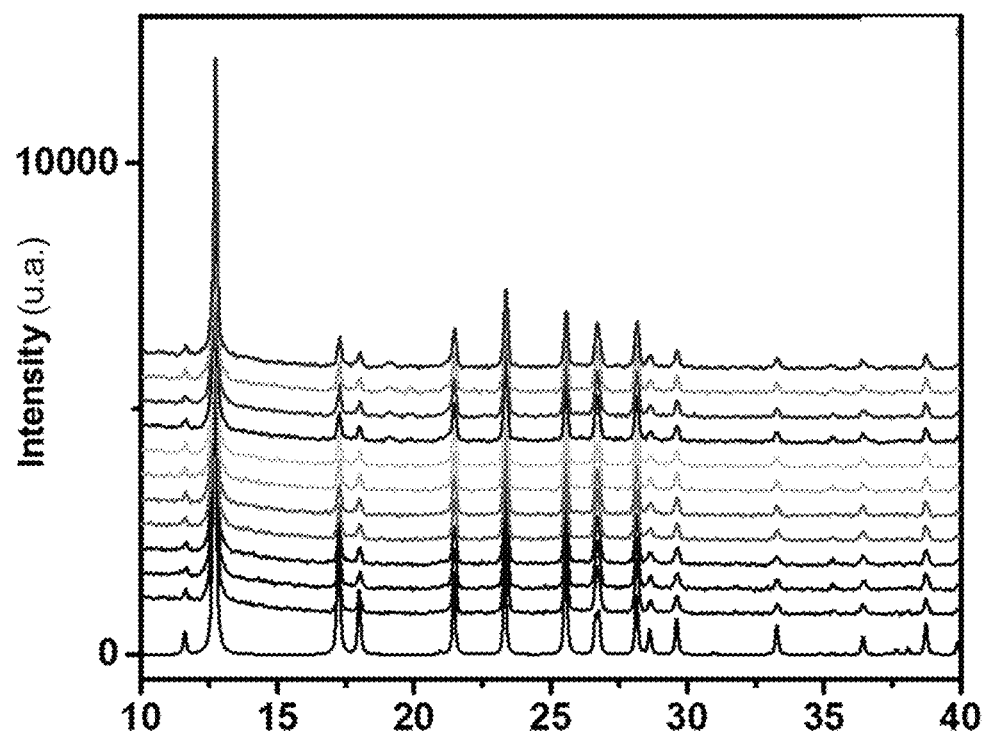
FIGS. 4A-B illustrate powder X-ray diffraction data of metal organic frameworks, according to one or more embodiments of this disclosure.
Figure 4B:
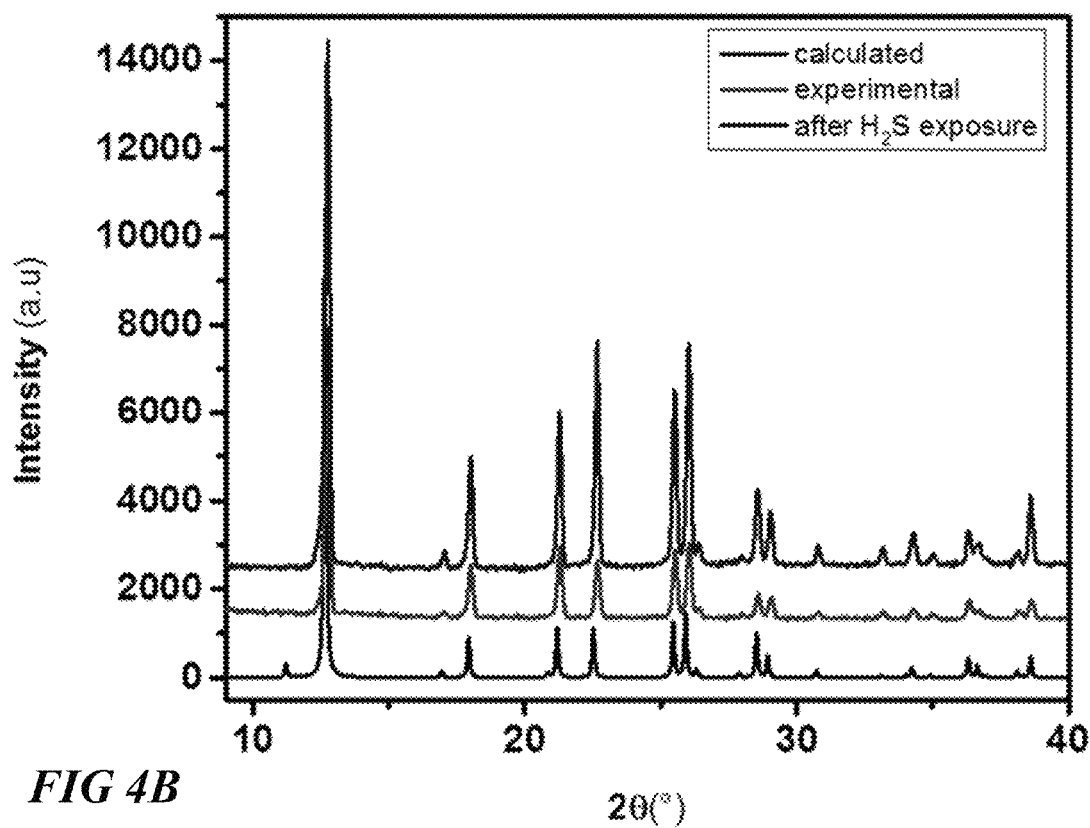

In one embodiment, a representative $M_aM_bF_xO_y(Ligand)_2$ MOF structure can include a Ni $M_a$ constituent, a Nb $M_b$ constituent group, and a Ligand comprising a pyrazine constituent group. FIG. 4A illustrates powder X-ray diffraction data of NbOFFIVE-1-Ni, confirming the high stability of the MOF in the presence of water. FIG. 4B illustrates powder X-ray diffraction data of NbOFFIVE-1-Ni, confirming the high stability of the MOF in the presence of $H_2S$. Powder X-ray diffraction data for AlFFIVEH$_2$O-1-Ni and FeFFIVEH$_2$O-1-Ni similarly show high stability in the presence of water and $H_2S$.

Figure 5A:
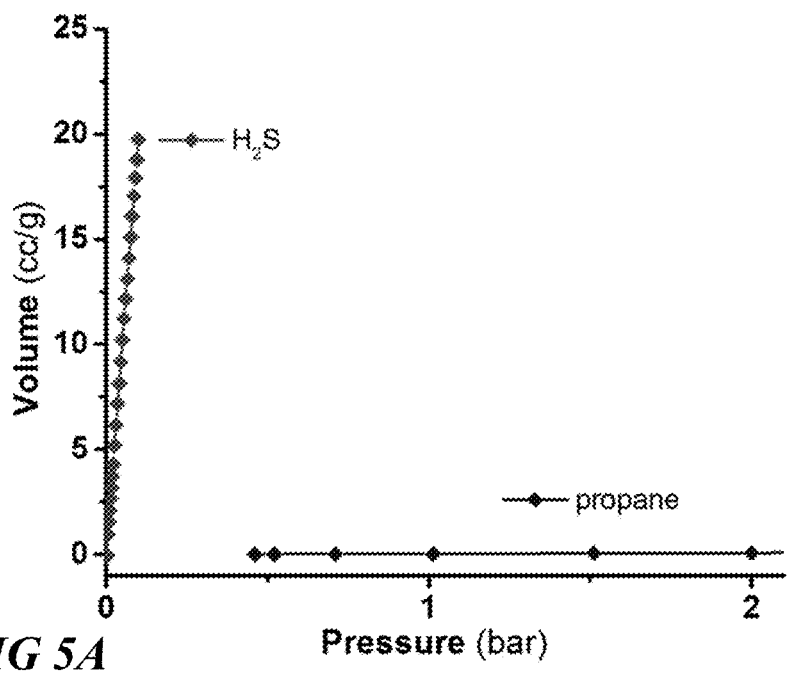
FIG. 5A illustrates propane sorption isotherm data of a metal organic framework, according to one or more embodiments of this disclosure.

FIG. 5A illustrates $H_2S$ and propane ($C_3H_8$) adsorption isotherms for NbOFFIVE-1-Ni. An adsorption isotherm determines the amount of adsorbed adsorbate over the dry mass of adsorbent as a function of its vapor pressure at constant temperature. The data in FIG. 5A indicates an extremely high sorption of $H_2S$ even at low pressure and essentially zero sorption of $C_3H_8$, even at over 2 bar at 298K. As shown in FIG. 5A, one or more MOFs described herein are suitable for $H_2S$ removal from polymer grade paraffins. In particular, one or more MOFs described herein are suitable for applications involving $H_2S$ removal from propane. Single gas adsorption data revealed that the NbOFFIVE-1-Ni channels with restricted aperture-size allowed the adsorption of $C_3H_6$ but did not permit the $C_3H_8$ to diffuse/adsorb into the pore system at 298 K up to ca. 1 bar. Significantly, $C_3H_6/C_3H_8$: 50/50 mixed gas adsorption data, collected at 298 K (up to 0.5 bar partial pressure of $C_3H_6$), overlayed perfectly with the pure $C_3H_6$ adsorption isotherm and thus supported the molecular exclusion of propane from propylene. The concomitant aperture size and shape expressed in this new MOF adsorbent provided the requisite size/shape cut-off in adsorption, resulting in the observed unprecedented infinite $C_3H_6/C_3H_8$ selectivity. The infinite selectivity was further confirmed by performing $C_3H_6/C_3H_8$: 50/50 mixed-gas column breakthrough experiments, imitating the real conditions for the $C_3H_6/C_3H_8$ separation process, at room temperature and 1 bar in a packed column bed of ca. 1.4 g of NbOFFIVE-1-Ni. Markedly, using 4 cm$^3$/min total gas flow, $C_3H_8$ was not adsorbed in the packed column bed while pure $C_3H_6$ was retained for ca. 480 seconds. Additionally, mixed-gas column breakthrough experiments were performed in dilute conditions using $N_2$ as a carrier inert gas, namely $C_3H_6/C_3H_8/N_2$: 5/5/90 and $C_3H_6/C_3H_8/N_2$: 25/25/90 mixtures. Noticeably, the pure $C_3H_6$ was retained in the packed column bed while $N_2$ and $C_3H_8$ were not adsorbed/retained by NbOFFIVE-1-Ni. Supportively, the regeneration/activation of the saturated adsorbent, desorption over a 10 minutes period, showed solely the propylene signal and thus confirming the non-adsorption/retention of the propane in the bed To further support and confirm the complete molecular exclusion of $C_3H_8$ and the sole adsorption of $C_3H_6$, simultaneous calorimetric and gravimetric measurements (TG-DSC) were performed at 1 bar. This complementary study confirmed the complete exclusion of propane from propylene as evidenced by the no detection of noticeable heat of adsorption in the case of $C_3H_8$ and the quantified heat of adsorption for $C_3H_6$ of 57.4 kJ/mol. High pressure adsorption studies confirmed the non-noticeable adsorption of $C_3H_8$ below 1.5 bar, only minor propane uptake was observed at around 1.5 bar (ca. 0.1 mol/Kg).

Noticeably, the resultant infinite propylene/propane selectivity has never been observed using adsorbent materials. Prior $C_3H_6/C_3H_8$ adsorption studies, using zeolite, carbon molecular sieves (CMS) or MOFs, revealed the plausible equilibrium and/or kinetic based separation but with a low to moderate separation factors.

Figure 5B:
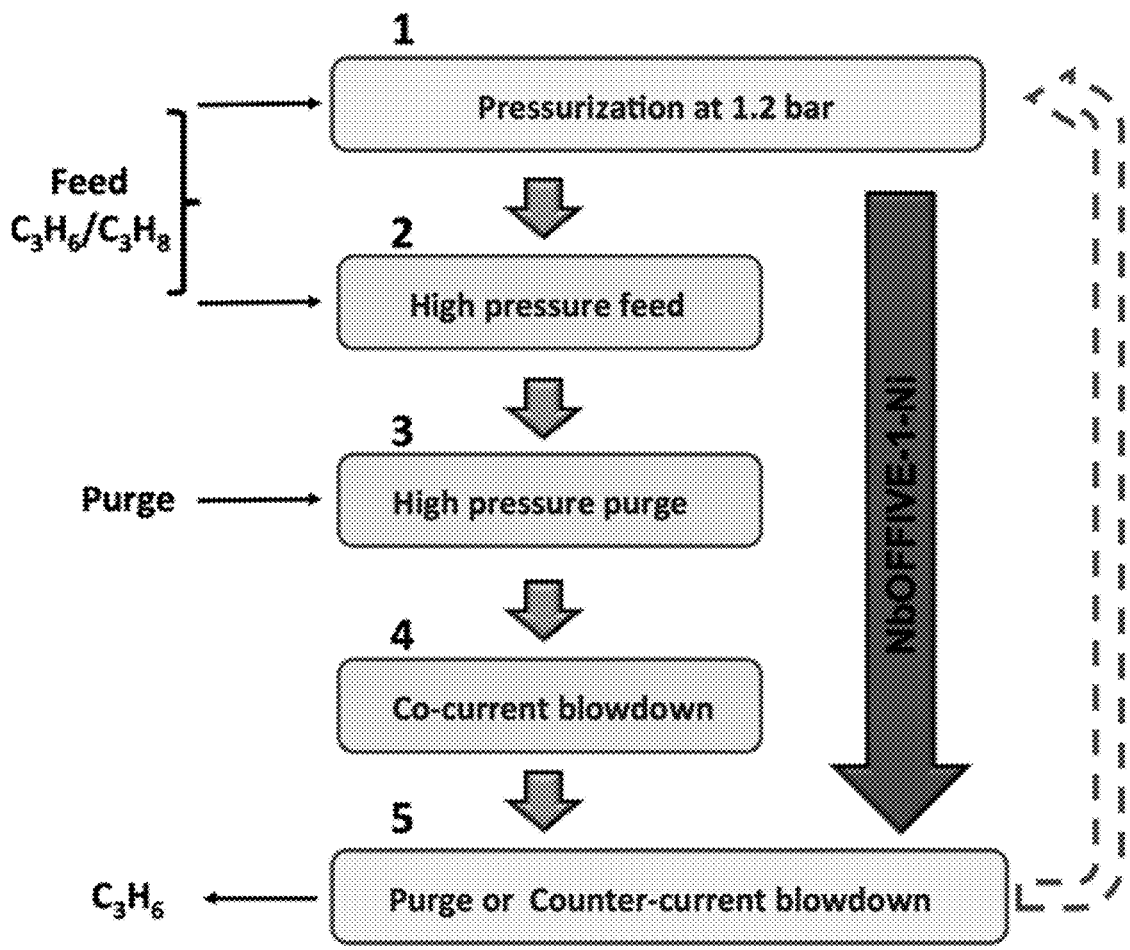
FIG. 5B illustrates a method for utilizing a metal organic framework as a molecular sieve, according to one or more embodiments of this disclosure.

FIG. 5B illustrates a method for utilizing NbOFFIVE-1-Ni as a $C_3H_8$ sieve in a two-step CSA or VSA (e.g., steps 1 and 5) as compared to the five step Pressure Swing Adsorption (PSA) method required by zeolites such as zeolite 4A. Valuably, the prospective deployment of NbOFFIVE-1-Ni as a splitter agent/adsorbent, permitting the complete sieving of $C_3H_8$ from $C_3H_6$, offers: (i) a simplified separation process based on a concentration swing recycling mode (CSRM) or a vacuum swing recycling mode (VSRM), where the ideal working $C_3H_6$ capacity can be accomplished by performing a desorption step with an inert gas (e.g. $H_2$ or $N_2$) purge at 1.2 bar or by simply reducing the pressure from 1.2 bar to 0.01 bar, (ii) the ability to eliminate the energy-demanding high pressure steps employed in the case of the zeolite 4A adsorbent, that is to say no pressurization (step 2), no purge (with $N_2$, step 3) and no co-current blow down (step 4) will not be required in the projected concentration swing adsorption (CSA) or vacuum swing adsorption (VSA) system using the NbOFFIVE-1-Ni adsorbent. Markedly, the implementation of the VSA system based on NbOFFIVE-1-Ni as an adsorbent offers potential to considerably reduce the energy penalty associated with the conventional $C_3H_6/C_3H_8$ separation, and valuably recover both $C_3H_6$ and $C_3H_8$ separately in a high purity grade.

Correspondingly, subsequent mixed-gas ($C_3H_6/C_3H_8$: 50/50) column breakthrough measurements were performed in order to corroborate the preservation of the adsorption properties and separation performance of the NbOFFIVE-1-Ni, namely the propylene adsorption uptake and the full molecular exclusion of propane from propylene at standard ambient temperature and pressure. Distinctively, the multiple adsorption/desorption measurements (over 10 cycles) using CSRM revealed that NbOFFIVE-1-Ni maintained its propylene adsorption capacity and its full molecular exclusion of propane. Detailed analysis of the data, for the $C_3H_6/C_3H_8$: 50/50 mixed gas adsorption cycles in a bed comprised of 1.4 g of NbOFFIVE-1-Ni, indicated a $C_3H_6$ uptake of ca. 0.60 mol/kg for a given cycle based on an 8 min adsorption followed by a 10 min desorption using CSRM. Considerably, this result pinpoints the appropriateness of the NbOFFIVE-1-Ni as a stable separating agent for propylene/propane with a pronounced propylene uptake/recovery of ca. 2 mol/Kg/hour. Markedly, the NbOFFIVE-1-Ni adsorbent offers potential to effectively separate propylene from propane with a reduced energy-footprint using a concentration swing adsorption (CSA). Perceptibly, the NbOFFIVE-1-Ni adsorbent proffers a plausible large propylene recovery/productivity and a marked higher purity than to the most prominent adsorbent for the said separation, namely the zeolite 4A using VSA at 423 K, offering only a limited 26% recovery for a propylene capacity of 1.03 mol/Kg/hour (0.13 mol/kg per cycle) with a 97% purity.

Figure 6A:
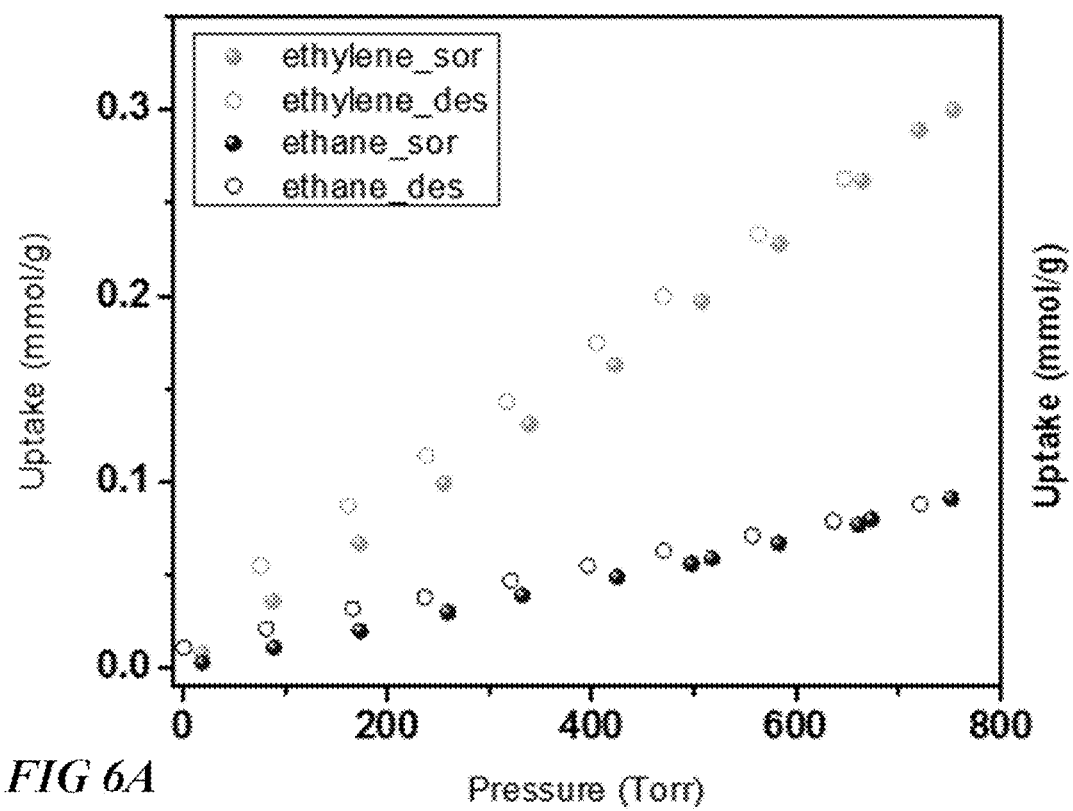
FIGS. 6A-B illustrate hydrocarbon sieving data, according to one or more embodiments of this disclosure.
Figure 6B:
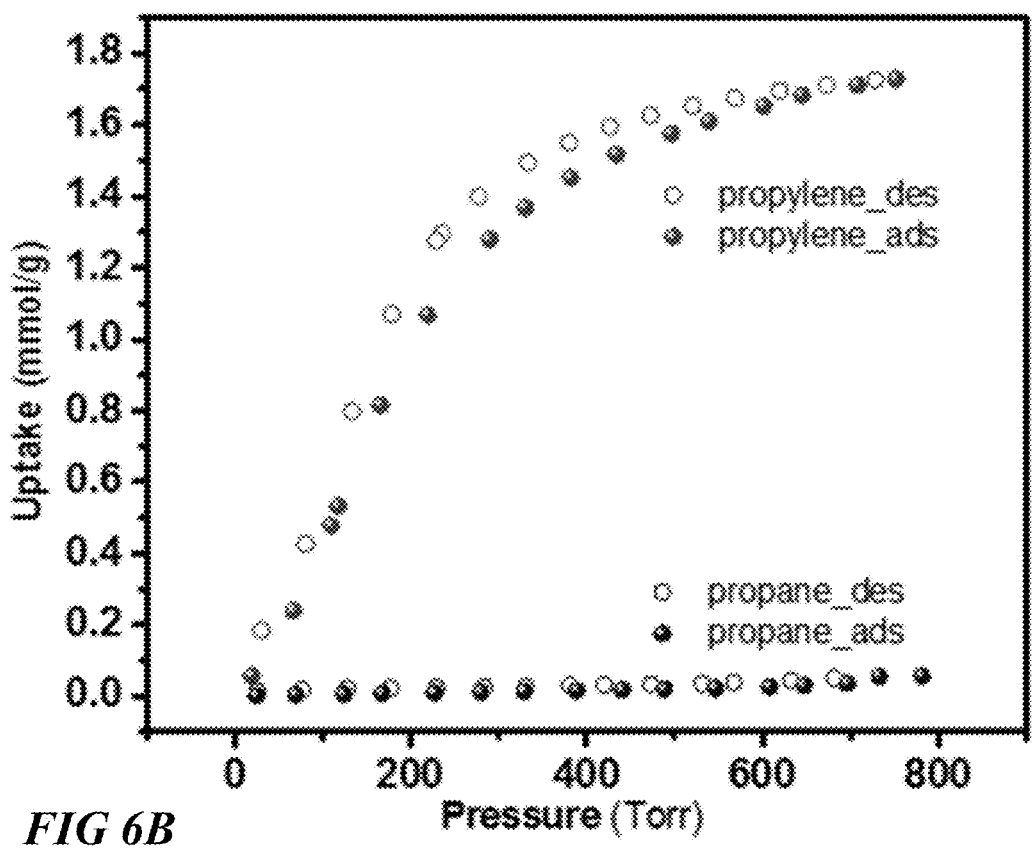

FIG. 6A illustrates ethylene and ethane sorption isotherms for NbOFFIVE-1-Ni, which show a positive correlation between increased ethane and ethylene sorption and increased pressure at 298 K. Increased pressure increases the ethylene/ethane sorption ratio, which demonstrates the potential for NbOFFIVE-1-Ni in molecular sieving, particularly in olefin/paraffin separations. Similarly, FIG. 6B illustrates propylene and propene sorption isotherms for NbOFFIVE-1-Ni, which show a positive correlation between increased propylene sorption and increased pressure and minimal propane sorption across all test pressures (0-800 Torr) at 298K. The propylene isotherms indicate Brunauer type-I adsorption characteristic of microporous adsorption at subcritical, near critical, and supercritical conditions, which is sometimes referred to as Langmuir adsorption. The plateau achieved at increasing pressure indicates monolayer coverage or complete saturation of the adsorbant, and can imply chemisorption. It can be noted that monolayer coverage, or near monolayer coverage, of propylene as shown in FIG. 6B was achieved at a much lower pressure than ethylene, which, as shown in FIG. 6A, has not achieved monolayer coverage, or near monolayer coverage, even at about 800 Torr. The similarity of the adsorption/desorption curves in FIGS. 6A-B for all species (ethylene, ethane, propylene, propane) suggest that there are no MOF structural changes during the adsorption process.

As shown in FIGS. 6A-B, one or more MOFs described herein are suitable for applications involving olefin/paraffin sieving separation. In particular, one or more MOFs described herein are suitable for applications involving propane/propene sieving separation. For example, NbOFFIVE-1-Ni shows full sieving of propene from propane. Such performance is unprecedented for any class MOFs both in industry and at the lab scale.

Similarly, one or more MOFs described herein are suitable for applications involving BTX removal from fluid compositions comprising $H_2S$. An example of a fluid composition comprising $H_2S$ is sour gas, which is generally defined as having more than 5.7 milligrams of $H_2S$ per cubic meter of gas. An example of sour gas is natural gas ($CH_4$) having more than 5.7 milligrams of $H_2S$ per cubic meter of $CH_4$. Removing BTX, BTEX, BTEXN, TEXS, and combinations thereof is critical to many industrial processes. For example, when $H_2S$ is recovered in any industrial process, it is most commonly desulfurized by the Claus process which converts the gaseous $H_2S$ to elemental sulfur. The Claus process includes a first thermal combustion step which typically achieves a 60-70% conversion of gaseous ($H_2S$) sulfur to elemental sulfur. A subsequent catalytic step converts the remaining gaseous $H_2S$ and employs an activated aluminum(III) and/or titanium(IV) oxide catalyst. Claus catalysts can suffer from gradual surface area degradation in the presence of moisture, but are readily deactivated in the presence of BTX, BTEX, BTEXN, TEXS, and combinations thereof.

Figure 7A:
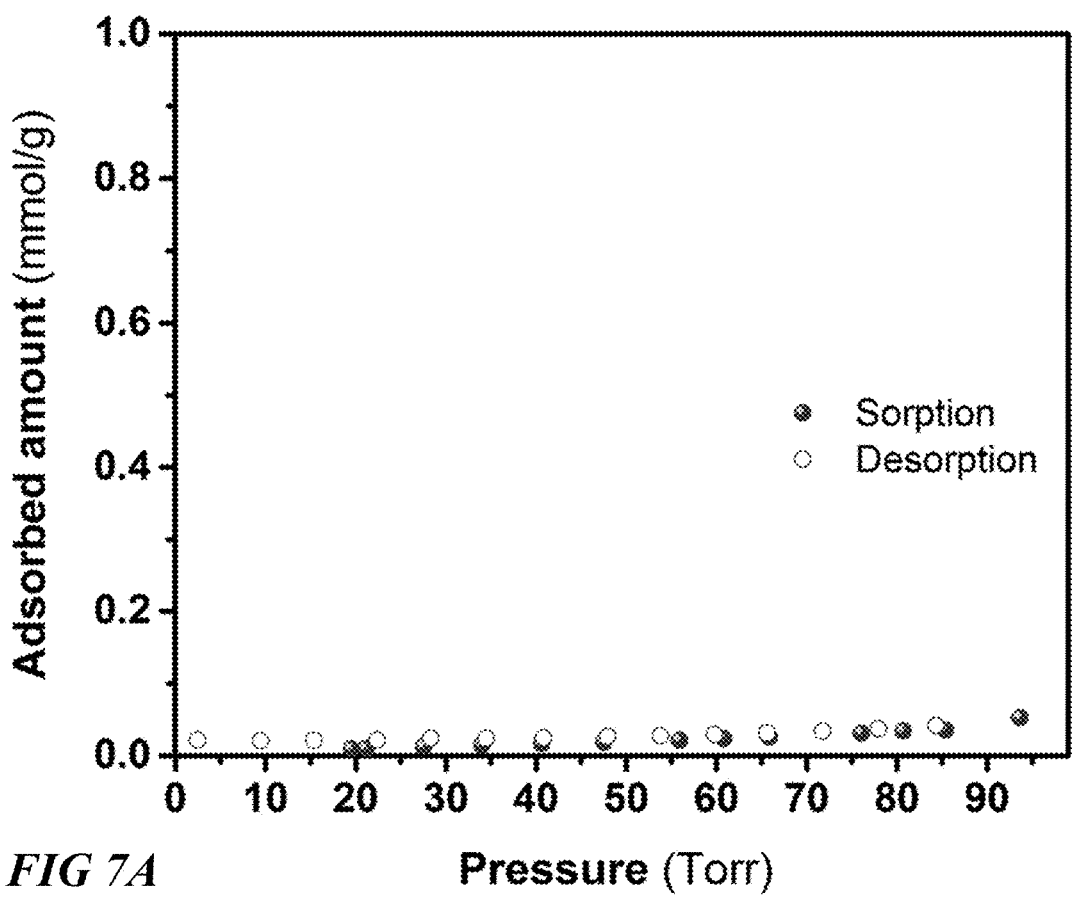
FIG. 7A illustrates benzene sorption isotherm data of a metal organic framework, according to one or more embodiments of this disclosure.

MOF's as provided herein, particularly those characterized by the formula $NiM_bF_{6-n}(H2O/O)_n(pyrazine)_2(solvent)_x$, wherein $M_b$ comprises Al, Fe, V, and Nb, offer an effective and unprecedented platform for moisture and BTX, BTEX, BTEXN, and TEXS extraction from $H_2S$ fluid compositions, particularly including Claus process feed streams. In particular, FIG. 7A shows benzene sorption isotherms at 293 K for NbOFFIVE-1-Ni. Benzene shows negligible adsorption, similar to the propane adsorption shown in FIG. 6B, due in part to the large molecule size of benzene. Similar adsorption behavior can be assumed for toluene, xylene, styrene, ethylbenzene, and naphthalene, among others. Such negligible adsorption is in stark comparison to that of $H_2S$, as shown in FIG. 6A. Therefore, NbOFFIVE-1-Ni is particularly suitable for removing $H_2S$ from fluid compositions comprising BTX, BTEX, BTEXN, TEXS, and combinations thereof. Such MOFs offer an attractive alternative to the activated carbon beds currently used to remove BTX from Claus catalyst process feed streams. This is in part because activated carbon beds include a large range of microspores which allow competitive adsorption of BTX and $H_2S$, and thus low $H_2S$/BTX selectivity. Conversely, MOFs such as NbOFFIVE-1-Ni offer almost infinite $H_2S$ selectivity.

Figure 8A:
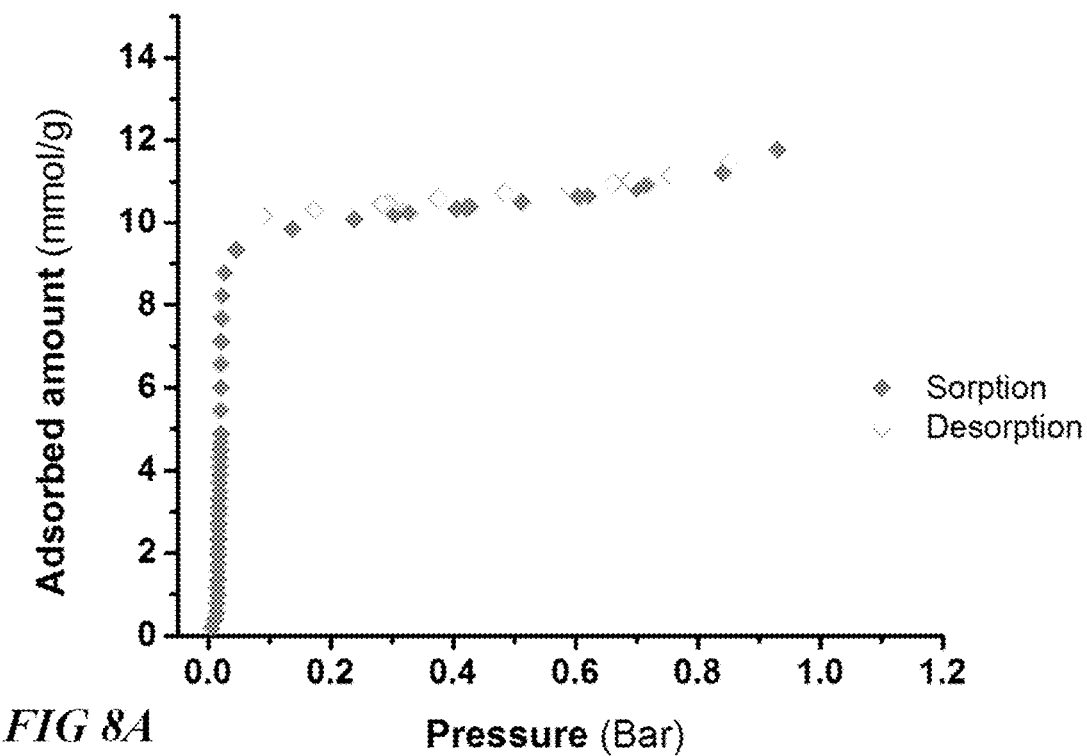
FIGS. 8A-C illustrate $H_2O$ sorption isotherm data of various metal organic frameworks, according to one or more embodiments of this disclosure.

FIG. 8A illustrates $H_2O$ sorption isotherms for NbOFFIVE-1-Ni, indicating an extremely high sorption of $H_2O$ across all test pressures (0-1.2 Bar), and notably monolayer coverage, or near monolayer coverage, at low pressure (e.g., 0 Bar) at 298K.

Figure 8B:
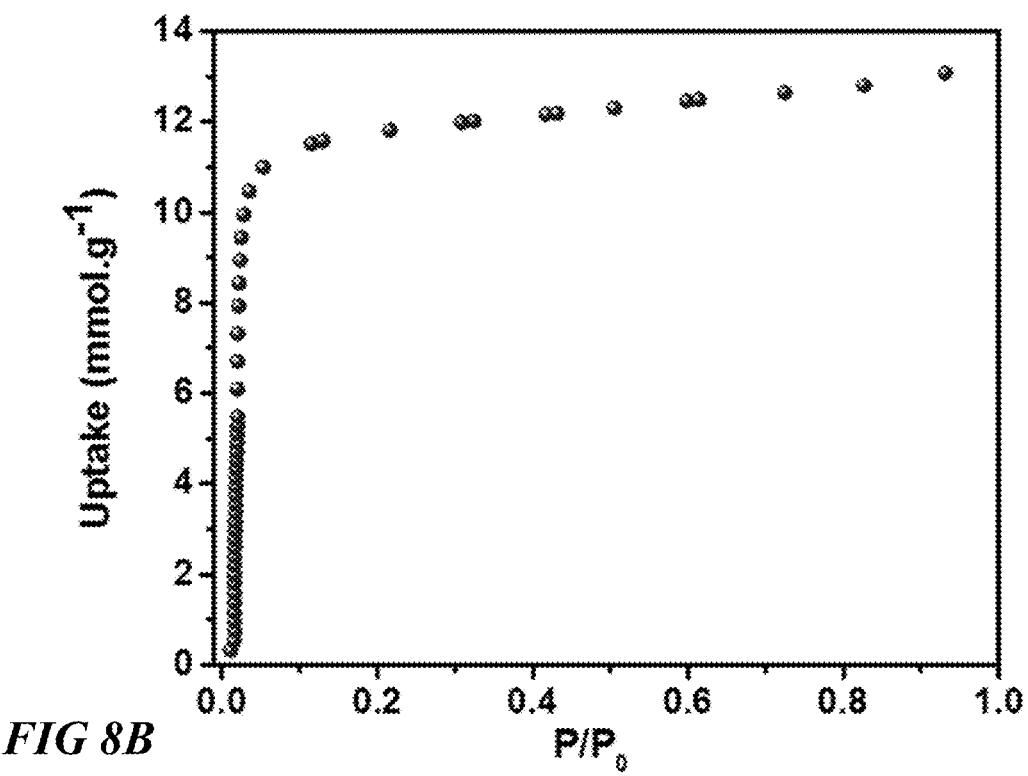
Figure 8C:
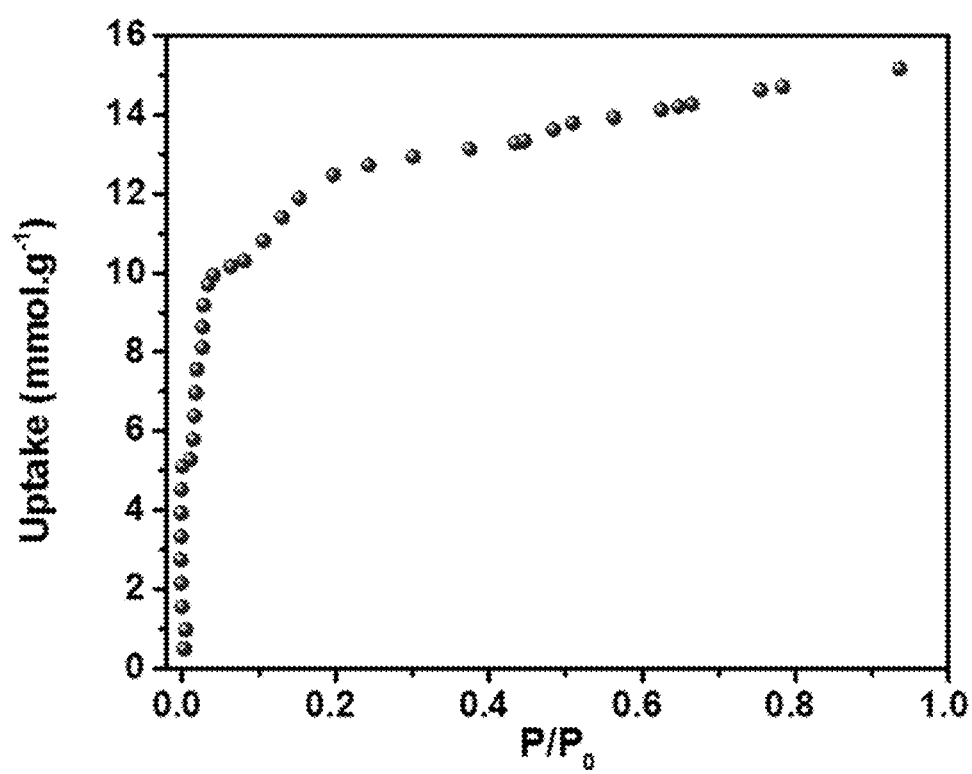

Similarly suitable for such applications are $AlFFIVEH_2O$-1-Ni and $FeFFIVEH_2O$-1-Ni. FIG. 8B illustrates variable temperature $H_2O$ adsorption isotherms for $AlFFIVEH_2O$-1-Ni, and FIG. 8C illustrates $H_2O$ adsorption isotherms for $FeFFIVEH_2O$-1-Ni at 295 K. Both adsorption isotherms exhibit unprecedented steepness at very low partial pressure that supports their extremely high affinity for water. Moreover, $AlFFIVEH_2O$-1-Ni and $FeFFIVEH_2O$-1-Ni show exceptional adsorption saturation of 22 and 18 wt %, respectively, at $P/P_0=0.05$ relative pressure and 293 K. Heats of adsorption for $AlFFIVEH_2O$-1-Ni and $FeFFIVEH_2O$-1-Ni were determined by TG-DSC experiments to be 63 kJ/mol and 64.7 kJ/mol respectively.

Figure 8D:
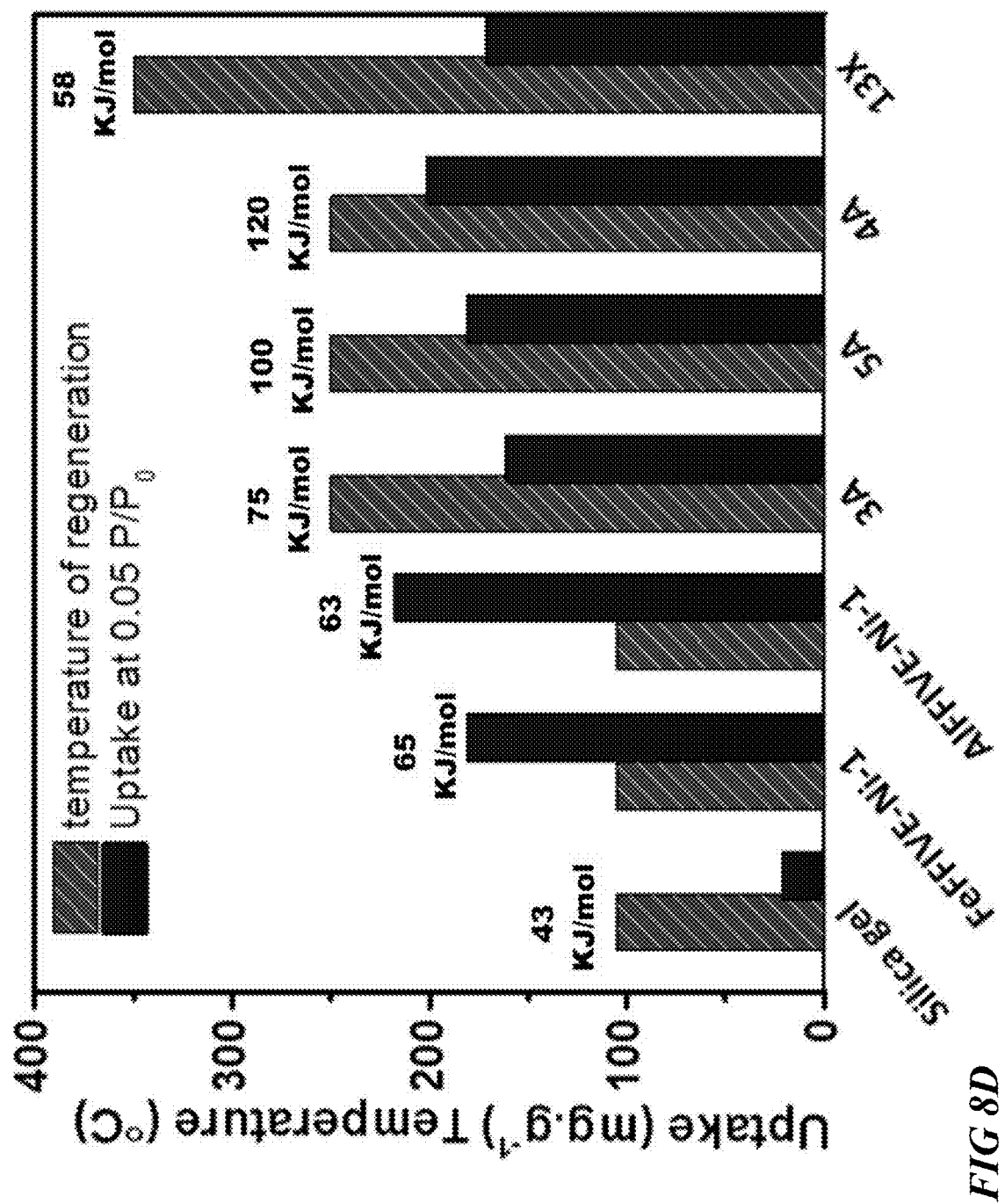
FIG. 8D illustrates a comparison of the relationship between water uptake at 0.05 $P/P_0$, heat of sorption and regeneration temperature of various metal organic frameworks, according to one or more embodiments of this disclosure.

FIG. 8D illustrates a comparison of the relationship between water uptake at 0.05 $P/P_0$, heat of sorption and regeneration temperature of $AlFFIVEH_2O$-1-Ni and $FeFFIVEH_2O$-1-Ni with other well-known dehydrating agents. It is worth mentioning that the heat of $H_2O$ adsorption at very low loading in case of the zeolite 5A is remarkably higher (80-120 kJ/mol) than $MFFIVEH_2O$-1-Ni (M=Al or Fe) series and consequently this behavior reflects the high desorption temperature 250° C. (523K) needed to ensure optimal cyclic operations. $MFFIVEH_2O$-1-Ni (M=Al or Fe) have the greatest advantage to necessitate a much less demanding energy of $H_2O$ vapour full desorption. In fact, activation/re-activation evaluation and adsorption/desorption cyclic properties of $AlFFIVEH_2O$-1-Ni demonstrated that the full dehydration is achievable after a simple heating at 95-105° C. (368-378K) combined with flushing a less absorbable gas (such as $N_2$) or vacuum. The low temperature recycling feature is of prime importance as it prevents all the concerns with regards to coke formation, commonly occurring using zeolites, when the dehydration is carried out in the presence of hydrocarbon and/or VOC at high temperatures. Silica gel can be recycled by heating only at 90-100° C. with a $H_2O$ heat of adsorption of 43-50 kJ/mol, but it exhibits much lower $H_2O$ adsorption uptake at low $H_2O$ vapor partial pressures as it is shown in FIG. 8D. Similar to the 3 A, 4 A, and 5 A molecular sieves, $MFFIVEH_2O$-1-Ni MOFs exhibit an excellent rate of $H_2O$ adsorption and much better adsorption kinetics than other types of desiccants.

Figure 9A:
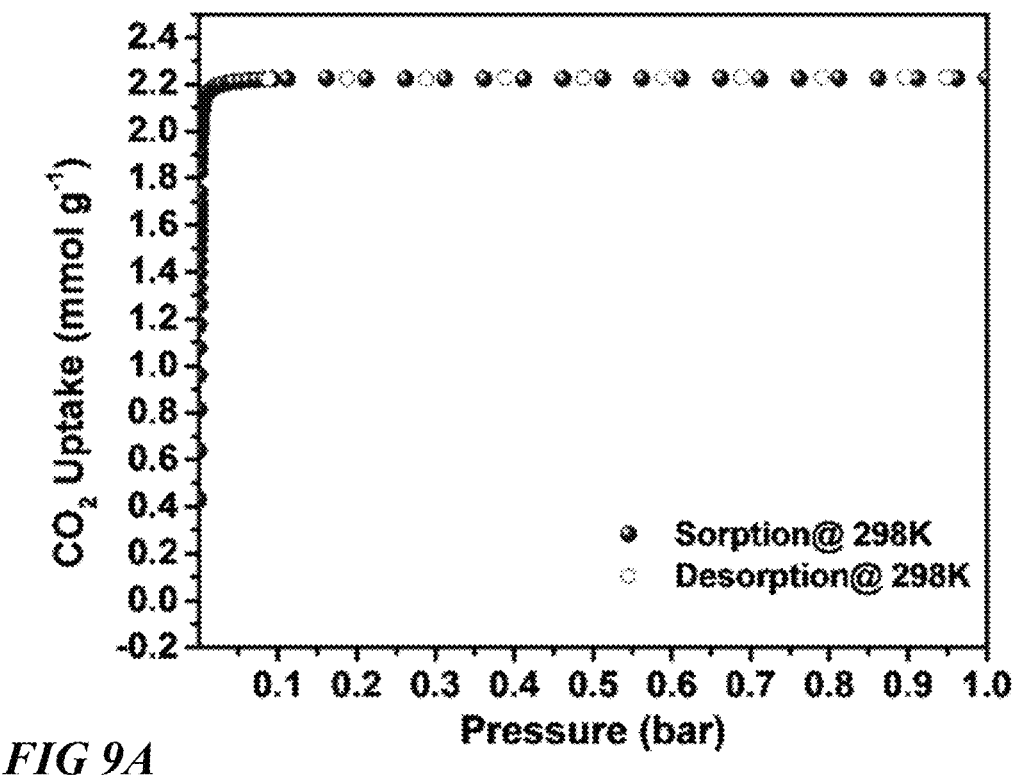
FIGS. 9A-C illustrate $CO_2$ sorption isotherm data of various metal organic frameworks, according to one or more embodiments of this disclosure.
Figure 9B:
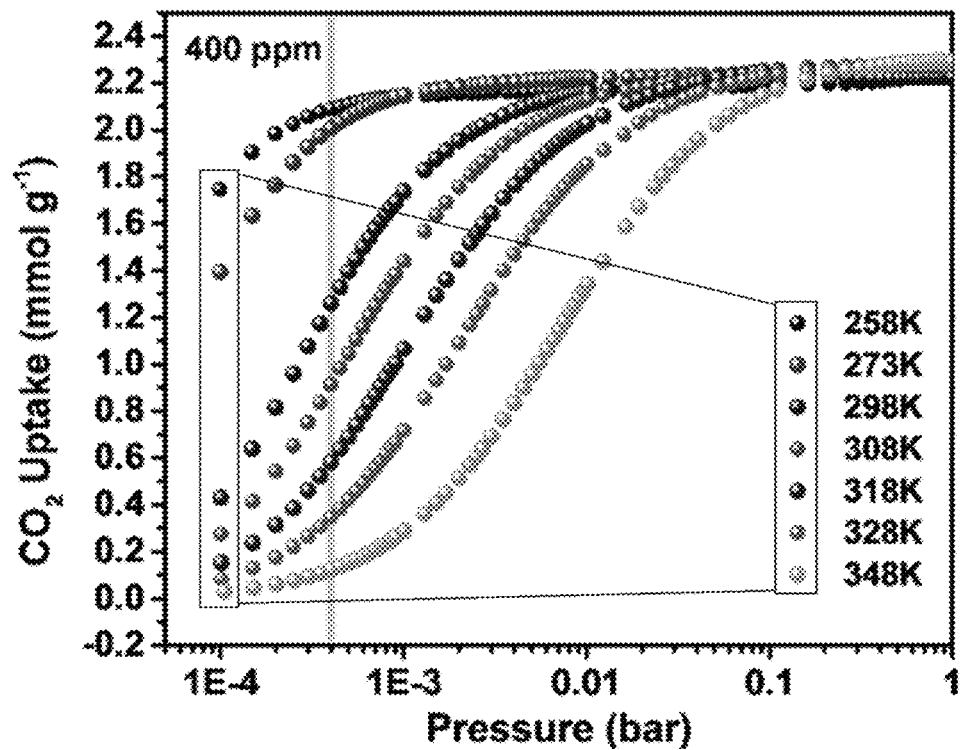
Figure 9C:
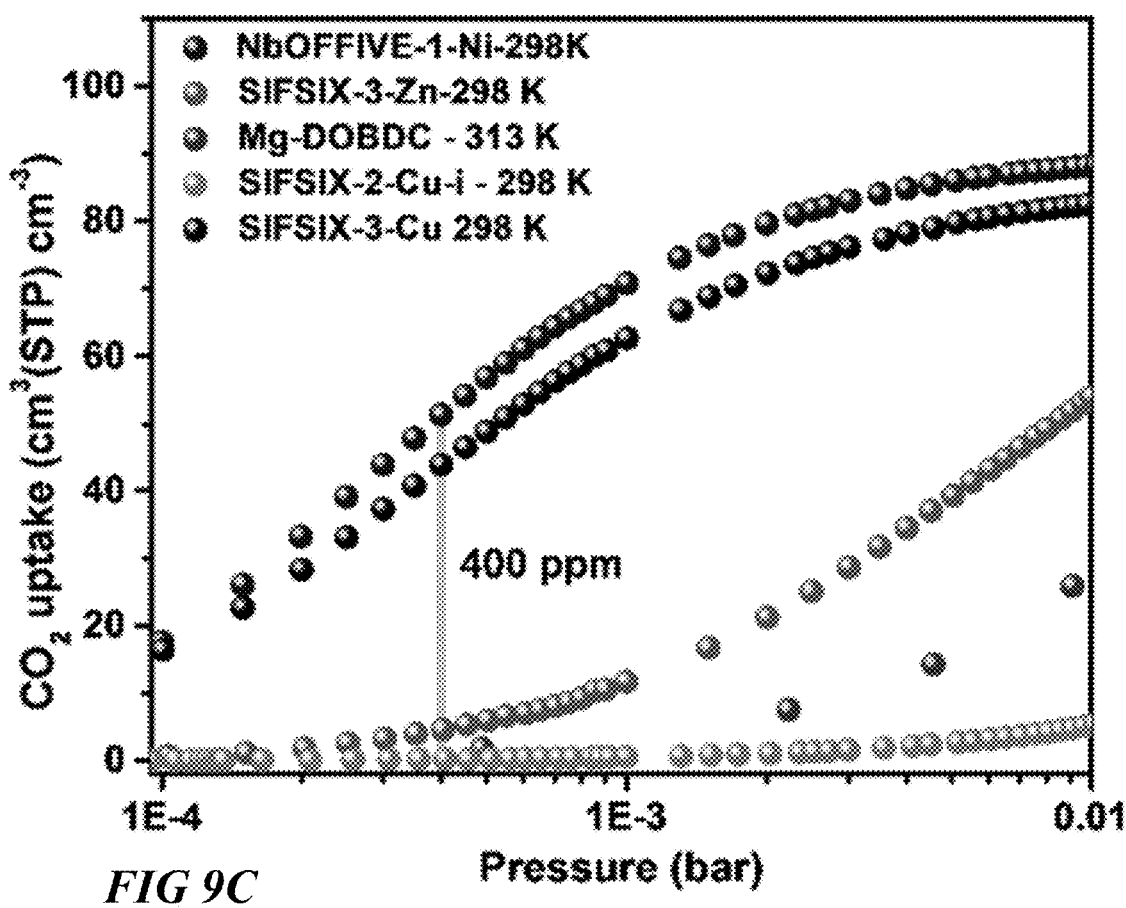

FIG. 9A illustrates a $CO_2$ isotherm up to 1 bar at 298K for NbOFFIVE-1-Ni and FIG. 9B illustrates a variable temperature adsorption isotherm for NbOFFIVE-1-Ni at temperatures ranging from 258K to 348K. NbOFFIVE-1-Ni shows steep adsorption isotherms for $CO_2$. FIG. 9C illustrates low pressure $CO_2$ isotherms for various MOFs, and shows that NbOFFIVE-1-Ni outperforms SIFSIX-3-Cu, the best known trace $CO_2$ capture MOF. NbOFFIVE-1-Ni absorbs 51.4 $cm^3/cm^3$ (1.3 mmol/g) $CO_2$ at 400 ppm and 298K as compared to 44.6 $cm^3/cm^3$ by SIFSIX-3-Cu, 15% higher than the best reported material. Consequently, NbOFFIVE-1-Ni is the best material for gravimetric and volumetric $CO_2$ capture at trace concentration, driven mainly by physisorption. The difference in uptake is observed even larger at higher temperatures where NbOFFIVE-1-Ni absorbs 63% more $CO_2$ at 400 ppm and 328K than SIFSIX-3-Cu. The volumetric uptake for well-known MOFs such as Mg-MOF-74 is comparatively very small at 400 ppm ($\approx 1.7$ $cm^3/cm^3$). In terms of gravimetric uptake both NbOFFIVE-1-Ni and SIFSIX-3-Cu have similar $CO_2$ capacity and adsorb 43 $cm^3$ STP/g at 1300 ppm and 298K, 300% higher than SAPO-34 ($Sr^{2+}$), a physical adsorbent candidate for $CO_2$ removal in long-duration crewed space exploration missions. Recently, a copper silicate (SGU-29) was reported showing ca. 26 $cm^3/cm^3$ and 40 $cm^3/cm^3$ uptake at $CO_2$ concentration of 400 and 1000 ppm (single gas adsorption), respectively. The $CO_2$ volumetric and gravimetric uptakes of this purely inorganic $CO_2$ adsorbent is much lower than NbOFFIVE-1-Ni at very low $CO_2$ pressure.

Figure 9D:
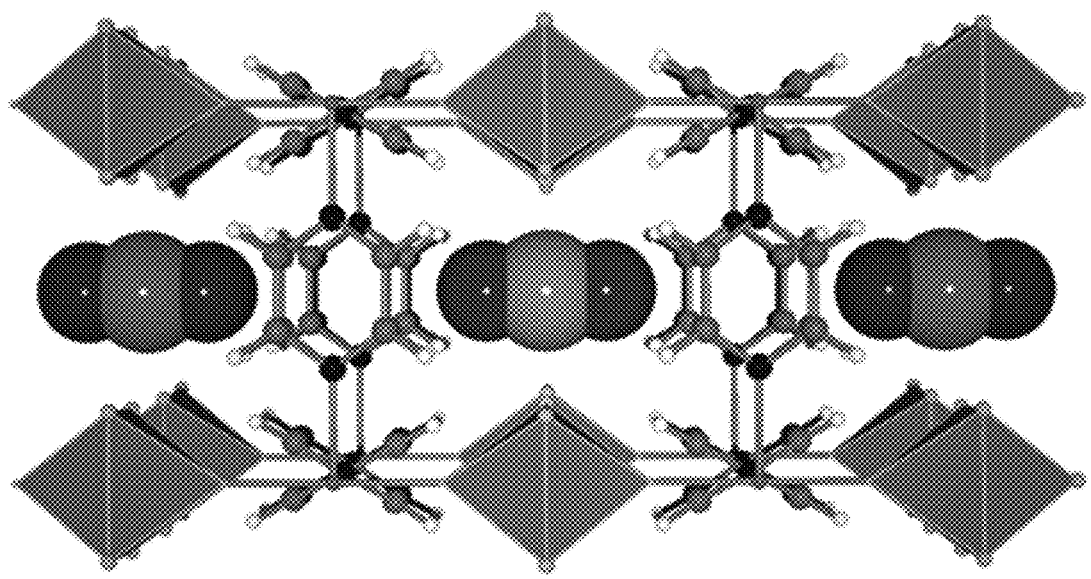
FIGS. 9D-E illustrate $CO_2$ guest molecules inside a metal organic framework, according to one or more embodiments of this disclosure.
Figure 9E:
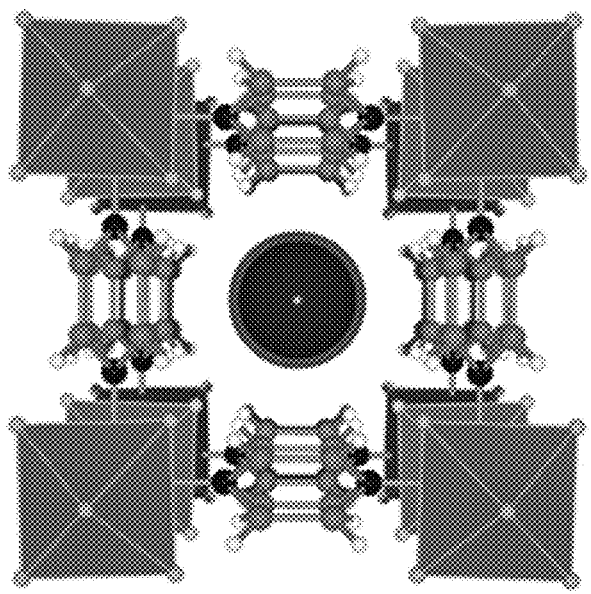
Figure 9F:
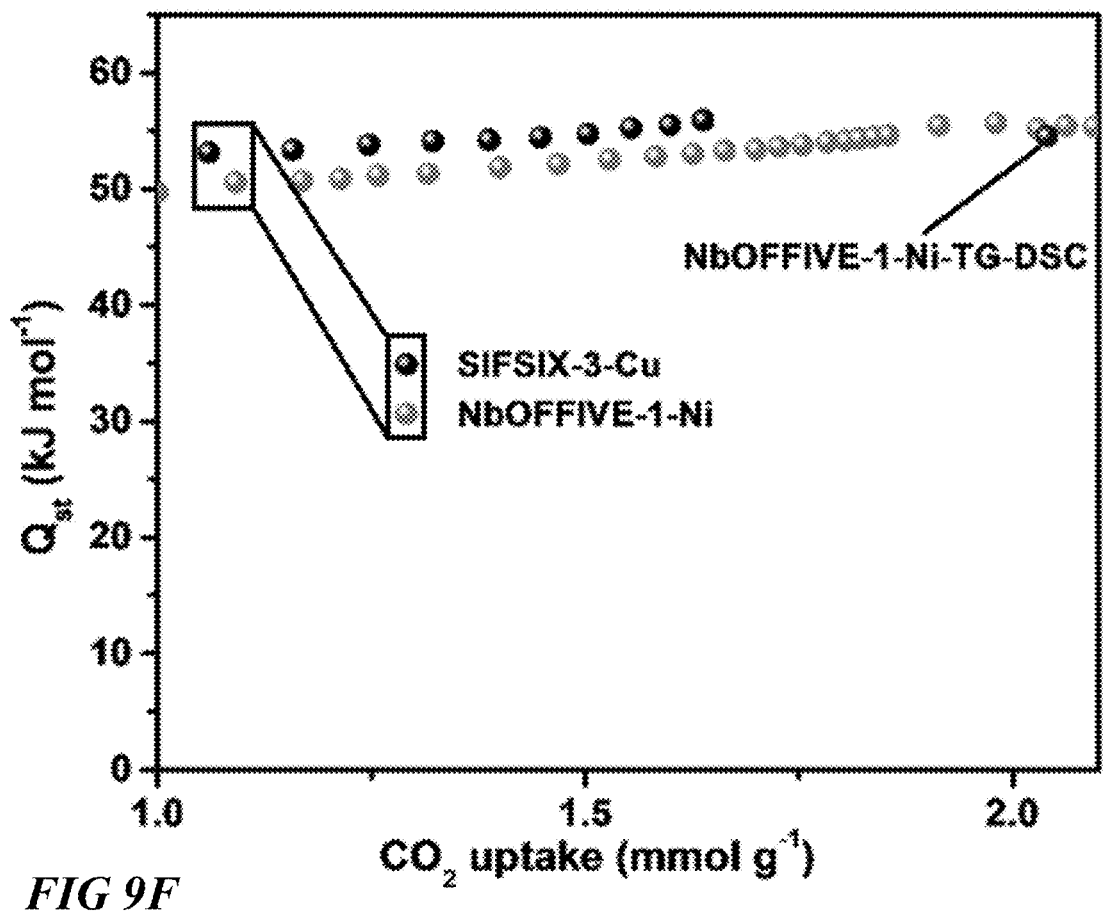
FIG. 9F illustrates $CO_2$ heat of sorptions of a metal organic framework, according to one or more embodiments of this disclosure.

Fourier difference data obtained through single crystal X-ray diffraction (SCXRD) of a degassed crystal of NbOFFIVE-1-Ni under 1 bar $CO_2$ atmosphere at 298K, indicated a clearly localized $CO_2$ molecule within the 1D channels of the structure. FIGS. 9D and 9E provide direct visualization of $CO_2$ molecules inside the crystal structure of NbOFFIVE-1-Ni showing the energetically highly favorable arrangement of $CO_2$ molecules inside the channels along [010] and [001], respectively. $CO_2$ occupies highly energetically favorable position, where electropositive carbon of $CO_2$ is surrounded by four electronegative fluorine of $(NbOF_5)^{2-}$ groups (C . . . F distance=3.04(1) Å) and electronegative oxygen atoms of $CO_2$ is surrounded by pyrazine hydrogens (C—H . . . O distance=2.98(1) Å, angle=119.9°). It can be inferred from the crystal structure that presence of strong complementary interactions at right position create energetically highly favorable 'sweet spot' for $CO_2$ that is responsible for uniquely strong physiosorption-driven $CO_2$ capture features in this material. The highly favorable interactions for $CO_2$ in case of NbOFFIVE-1-Ni are reflected in the value of heat of $CO_2$ adsorption, shown in FIG. 9F, which are comparable to that of SIFSIX-3-Cu. The heat of $CO_2$ adsorption for NbOFFIVE-1-Ni was determined using variable temperature isotherms and further confirmed by direct TG-DSC measurement.

Figure 9G:
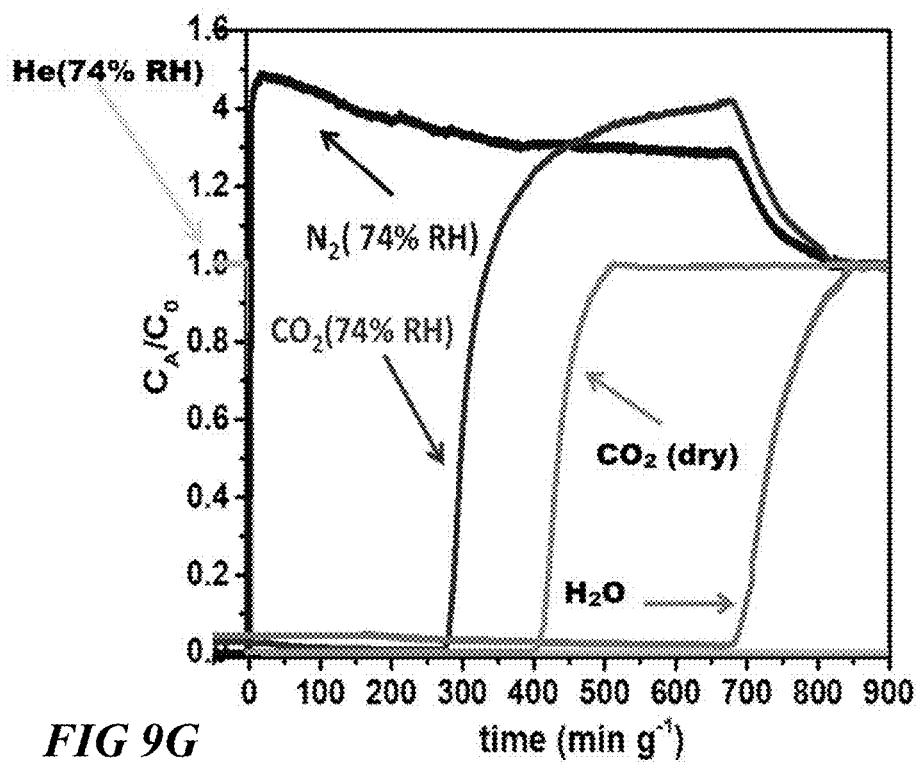
FIG. 9G illustrates cyclic $CO_2/N_2$ column breakthrough experiments for an MOF, according to one or more embodiments of this disclosure.

FIG. 9G illustrates cyclic $CO_2$ (1%)/$N_2$(99%) column breakthrough experiments at 298K in both dry and humid conditions. The breakthrough time under dry condition for 1% $CO_2$ in the gas stream with the flow rate of 10 cc/min was impressive 415 min/g (8.2 wt %).

Advantageously, the presence of humidity (75% RH) did not significantly alter the $CO_2$ breakthrough time (283 min/g, uptake of 5.6 wt %). In addition, the $CO_2$ uptakes in dry and humid streams were reproducible after reactivation at 378K. Interestingly, the water vapor was retained in the column for 1100 min/g which corresponds to an uptake of 13.8 wt %. Column breakthrough experiments were also carried out at trace concentration of $CO_2$ (1000 ppm $CO_2$) with the flow rate of 20 cm³/min, proving that $CO_2$ could be retained in the column for 1880 min/g with an uptake of 7.4 wt %.

Figure 9H:
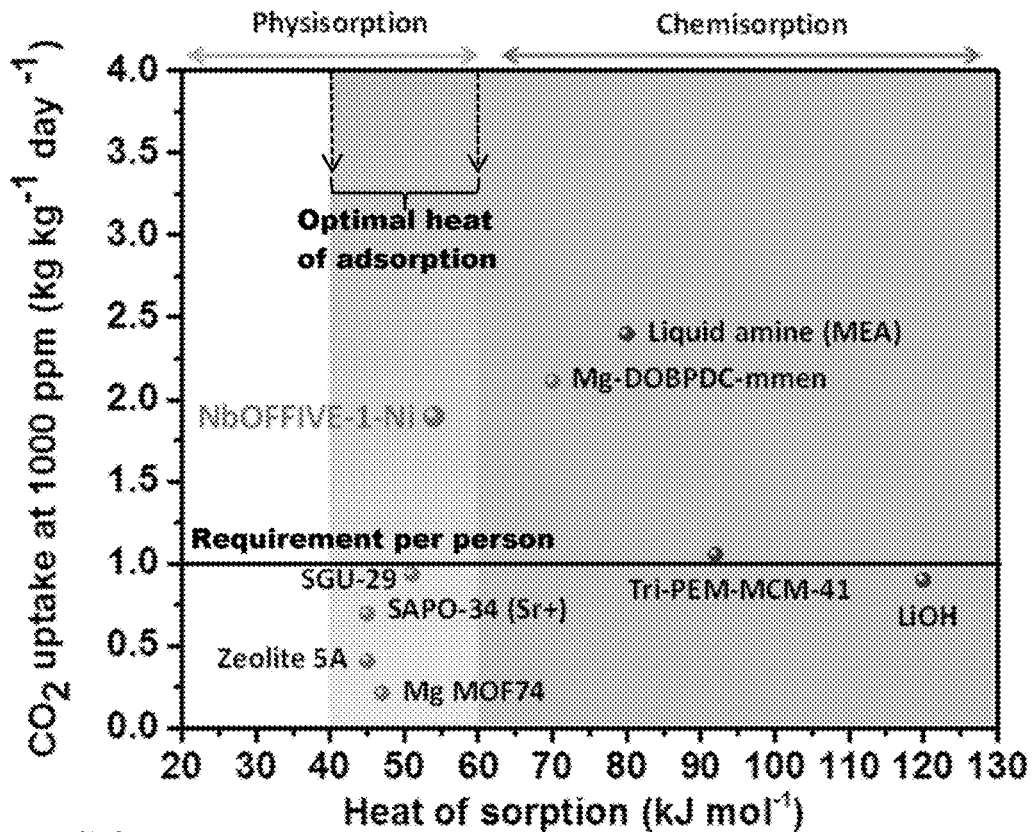
FIG. 9H illustrates a heat of adsorption-$CO_2$ uptake trade-off for a metal organic framework as compared to benchmark and new developed materials, according to one or more embodiments of this disclosure.

For comparison purposes, NbOFFIVE-1-Ni was evaluated against other benchmark materials used in real world (both chemical and physical absorbents) as well as other newly developed promising materials, in terms of $CO_2$ heat of adsorption and $CO_2$ removal capacity during 1 day at around 1000 ppm $CO_2$. For practical purposes it was assumed that all sorbent were fully recyclable, with the exception of LiOH, which is a non-recyclable sorbent. The adsorption-desorption recycling was assumed to be 60 min (24 cycles a day) and the comparison was based on the $CO_2$ scrubbing requirement of 1 kg of $CO_2$/1 day/1 person in confined spaces. The results in FIG. 9H show that NbOFFIVE-1-Ni exhibits the best compromise between high $CO_2$ capacity in 1 day (24 cycles) at 1000 ppm $CO_2$ and optimal heat of adsorption (or energy required for regeneration) as compared to LiOH, liquid amine, amine supported solids, zeolites 5A ($Ca^{2+}$), SAPO-34 ($Sr^{2+}$) and the recently unveiled copper silicate (SGU-29). All the $CO_2$ adsorption capacities were determined at equilibrium.

The data in FIGS. 9A-G demonstrate the applicability of NbOFFIVE-1-Ni and other MOFs described herein for $CO_2$ capture applications in confined spaces and/or from ambient air. Moreover, new pcu-based MOFs, such as NbOFFIVE-1-Ni, using reticular chemistry are shown to be more efficient and stable than the best-known materials for $CO_2$ capture from atmospheric and confined space. Further, unlike many other MOFs, NbOFFIVE-1-Ni is easy to synthesize in large quantity (g to kg) in very economical manner, making it a commercially viable candidate.

AlFFIVEH$_2$O-1-Ni and FeFFIVEH$_2$O-1-Ni are similarly suitable for $CO_2$ adsorption applications, particularly for adsorbing $CO_2$ from natural gas, flue gas and syngas, as these materials show selectivity for $CO_2$ over $N_2$, $CH_4$ and $H_2$. The heat of adsorption of $CO_2$, determined from variable temperature adsorption isotherms for AlFFIVEH$_2$O-1-Ni and FeFFIVEH$_2$O-1-Ni, is 45 kJ/mol and 48 kJ/mol, respectively. This was further confirmed by direct calorimetric measurement of $CO_2$ adsorption for the aluminum (43 kJ/mol) and iron (45.3 kJ/mol) analogues. By comparison with the Qst associated to $H_2O$ adsorption, it is clear that the framework-$CO_2$ interactions (45 kJ/mol) are much weaker than the framework-$H_2O$ interactions, which is mainly due to water coordination to the available open metal site in the highly confined pores.

With the aim to study the dehydration performance of MFFIVEH$_2$O-1-Ni for $CO_2$ containing gas streams in general and NG in particular, breakthrough adsorption column experiments were carried out on AlFFIVEH$_2$O-1-Ni for single water vapor in the presence of $N_2$, $CH_4$ and $CO_2$ using the same total flow (23 cm³/min) and relative humidity (75% RH). Interestingly, the $H_2O$ retention time in the column was similar (500-600 min/g within experimental error) independently if $CH_4$ and $CO_2$ are present or not in the $CO_2$/$CH_4$: 1/99 mixture. Further investigation using $CO_2$/$N_2$ mixture systems with increasing $CO_2$ concentration at 1, 10 and 50% showed no changes for the water vapor retention time in the column (500-600 min/g within experimental error). All these results prove that the same water vapor adsorption behavior and uptake occurred independently on the $CO_2$ composition and the type of mixtures tested ($CO_2$/$CH_4$: 1/99, $CO_2$/$N_2$: 1/99, $CO_2$/$N_2$: 10/90 and $CO_2$/$N_2$: 50/50).

On the other hand, while $N_2$ and $CH_4$ did not show any noticeable uptake in both dry and humid conditions, the retention time in the column for $CO_2$ during moisture containing tests was only slightly different (within experimental error) compared to the corresponding dry tests for all the mixtures studied.). Although the AlFFIVEH$_2$O-1-Ni framework is energetically favorable for $H_2O$ adsorption, these results show that $CO_2$ is still adsorbing in the presence of moisture.

To delineate further the mechanism occurring during the simultaneous $CO_2$ adsorption in hydrated $CO_2$/$N_2$ and $CO_2$/$CH_4$ mixtures, post in-situ temperature programed desorption (after water vapor saturation) in the case of $CO_2$/$N_2$/$H_2O$ mixture was carried by heating progressively at 55° C., 85° C. and 95° C. It was observed that $H_2O$ and $CO_2$ still desorb from the column, indicative of residual adsorbed $CO_2$ remaining in the pores of AlFFIVEH$_2$O-1-Ni even at 95° C. These result show that AlFFIVEH$_2$O-1-Ni could potentially adsorb $CO_2$ and $H_2O$ simultaneously. In addition, calorimetric measurements of hydrated $CO_2$/$N_2$: 1/99 showed similar $CO_2$ and $H_2O$ heat of adsorption as compared to the corresponding values for single $H_2O$ vapor and $CO_2$. These results represent a breakthrough/unprecedented finding in material development for $CO_2$ capture and NG upgrading in hydrated gas streams.

Because $H_2O$/$CO_2$ separation system on AlFFIVEH$_2$O-1-Ni is mainly being driven by thermodynamics (no kinetic barrier), where $CO_2$ and $H_2O$ can access the pore system easily, we intended to find the cut-off molecular size imposed by the access to the pores channels. In light of the theoretically (from crystal structure) slightly large aperture size in case of MFFIVEH$_2$O-1-Ni as compared to the previously reported NbOFFIVE-1-Ni suitable for $C_3H_8$ full sieving, we targeted to explore the adsorption of slightly bigger probe molecules such as n-$C_4H_{10}$, iso-$C_4H_{10}$, 1-propanol and iso-propanol. AlFFIVEH$_2$O-1-Ni showed increasing selectivity for isobutene, n-butane, and 1-butene. FeFFIVEH$_2$O-1-Ni showed increasing selectivity for isobutene and n-butane. AlFFIVEH$_2$O-1-Ni and FeFFIVEH$_2$O-1-Ni each showed increasing selectivity for isopropanol, 1-propanol, and ethanol. Interestingly AlFFIVEH$_2$O-1-Ni and FeFFIVEH$_2$O-1-Ni showed no adsorption for iso-butane and iso-propanol indicative of evident efficient dehydration, via full sieving, of gases/vapors with equal and larger sizes than iso-butane and iso-propanol.

These results demonstrate the value of the MOF embodiment characterized by the formula Ni(Al, Fe, V, or Nb)F$_5$O (pyrazine)$_2$(solvent)$_x$ as a platform for refining a number of valuable hydrocarbon gases and fluids, including methane and propane. Further, these results suggest this MOF can be used to refine other hydrocarbon gases and fluids, including ethane, butane, and others. The data in FIG. 6A also suggests NbOFFIVE-1-Ni can further be used for achieving a particularized fluid mixture. For example, a fluid stream containing initial ethylene and ethane amounts can be altered by varying the pressure at which the fluid contacts the MOF. The exemplary performance and properties of the $Nb^{5+}$ based MOFs disclosed herein are notably achieved in spite of having no open metal sites. These and other results can be expected in similar other embodiments, with or without open metal sites, such as MOF structure characterized by the formula $NiM_bF_5O(pyrazine)_2$, wherein $M_b$ can be one of the following $Al^{+3}$, $Fe^{+2}$, $Fe^{+3}$, $Cr^{2+}$, $Cr^{3+}$, $Ti^{3+}$, $V^{3+}$, $V^{5+}$, $Sc^{3+}$, $In^{3+}$, $Nb^{5+}$, $Y^{3+}$. These and other results can be expected in similar other embodiments, with or without open metal sites, such as MOF structure characterized by the formula $M_aNbF_5O(pyrazine)_2$, wherein $M_a$ can be one of the following cations: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$.

Example 1

Aperture Size Modification

Altering the nature, shape, and dimensions of the pillars employed in $[M_aM_bF_{6-n}(O/H_2O)_w(Ligand)_x(solvent)_y]_z$ MOFs can selectively hinder the free rotation of ligands and thus dictate the maximum and/or minimum opening of the pore aperture size. This approach offers potential to dial-in/command the passing-blocking of specific probe molecules. The $(NbOF_5)^{2-}$ pillaring inorganic building block of NbOFFIVE-1-Ni utilizing a pyrazine ligand demonstrates this approach. Analysis of the NbOFFIVE-1-Ni structure (collected at 100K) revealed the plausible smallest pore window opening associated with the relatively hindered rotation of the $(NbOF_5)^{2-}$ pillars and the presence of hydrogen bond interactions. As a result, the hydrogen atoms of the pyrazine linkers circumference the resultant rectangular aperture size of 2.838(1) Å prohibiting the diffusion of any molecule other than water. In order to gain a better insight on the plausible rotation and tilting of the pyrazine linker and subsequently derive a relative maximum opening of the window, providing a gate limit for the largest molecule to pass through, the same structure was collected and analysed at room temperature. Noticeably, at room temperature, the pyrazine molecules are perceived to freely rotate along the N . . . N axis, while the $(NbOF_5)^{2-}$ pillars rotate along the 4-fold axis. The concurrent pyrazine and pillars $(NbOF_5)^{2-}$ mobility afforded a maximum window aperture size of 4.752(1) Å.

To further confirm the restricted pore size opening due the hindered rotation of pyrazine ligands at low temperature, we performed adsorption studies on the fully evacuated NbOFFIVE-1-Ni. As anticipated, NbOFFIVE-1-Ni did not adsorb $N_2$ at 77K, indicating the restricted access to $N_2$ at this low cryogenic temperature due to the contracted window aperture size. On the other hand, adsorption studies performed at room temperature using $CO_2$ as the adsorbate molecule revealed that NbOFFIVE-1-Ni is microporous with a BET surface area of 280 $m^2/g$ and a pore volume of 0.095 $cm^3/g$.

What is claimed is:

1. A method of $CO_2$ removal, comprising:
   contacting a metal organic framework with air from a confined space; and
   capturing $CO_2$ from the air;
   wherein the metal organic framework comprises:
   a pillar of the formula $(M_bF_5(O/H_2O))$, where $M_b$ is selected from periodic groups IIIA, IIIB, IVB, VB, VIB, and VIII, and
   a square grid of the formula $(M_a(ligand)_x)$, where $M_a$ is selected from periodic groups IB, IIA, IIB, IIIA, IVA, IVB, VIB, VIIB, and VIII, ligand is a polyfunctional organic ligand, and x is 1 or more,
   wherein the pillar associates with the square grid to form the metal organic framework.

2. The method of claim 1, further comprising, after capturing, recycling air having a reduced concentration of $CO_2$ back to the confined space.

3. The method of claim 1, further comprising regenerating the metal organic framework once a $CO_2$ removal capacity of the metal organic framework is reached.

4. The method of claim 3, wherein the energy requirements for the regenerating is about 2500 kJ/kg $CO_2$ or less.

* * * * *